United States Patent [19]

Bogdashevsky et al.

[11] Patent Number: 6,006,188

[45] Date of Patent: Dec. 21, 1999

[54] SPEECH SIGNAL PROCESSING FOR DETERMINING PSYCHOLOGICAL OR PHYSIOLOGICAL CHARACTERISTICS USING A KNOWLEDGE BASE

[75] Inventors: Rostislav Bogdashevsky; Vladimir Alexeev; Vitaly Yarigin, all of Moscow, Russian Federation; George Baker, Los Alamos, N.Mex.; Harrison Stanton, Henderson, Nev.

[73] Assignee: Dendrite, Inc., Las Vegas, Nev.

[21] Appl. No.: 08/820,566

[22] Filed: Mar. 19, 1997

[51] Int. Cl.⁶ .................................. G01L 5/06; G01L 9/00
[52] U.S. Cl. ............................................. 704/270; 706/50
[58] Field of Search ........................... 704/270; 434/236, 434/262; 706/50

[56] References Cited

U.S. PATENT DOCUMENTS

| | | | |
|---|---|---|---|
| 3,855,416 | 12/1974 | Fuller | 704/272 |
| 3,855,417 | 12/1974 | Fuller | 704/272 |
| 3,855,418 | 12/1974 | Fuller | 704/272 |
| 3,971,034 | 7/1976 | Bell, Jr. et al. | 346/33 R |

(List continued on next page.)

FOREIGN PATENT DOCUMENTS

| | | | |
|---|---|---|---|
| 0424071 A2 | 4/1991 | European Pat. Off. | G10L 5/06 |
| 94/04072 | 3/1994 | WIPO | A61B 5/00 |
| 95/20216 | 7/1995 | WIPO | G10L 9/00 |
| WO 95/20216 | 7/1995 | WIPO | G10L 9/00 |

OTHER PUBLICATIONS

Toyotoshi Yamada, et al. "Pattern recognition of emotion with Neural Network," Proc. IEEE IECON, vol. 1, p. 183–187, Nov. 1995.

Tsuyoshi Moriyama, et al. "Evaluation of the Relationship Between Emotional Concepts and Emotional Parameters of Speech," Proc. ICASSP, p. 1431–1434, Apr. 1997.

Alan A. Wrench, et al. "Objective Speech Quality Assessment in Patients With Intra–Oral Cancers: Voiceless Fricatives", International Conference on Spoken Language Processing ICSLP, Oct. 1992.

Alan A. Wrench, et al. "A Speech Therapy Workstation Providing Visual Feedback of Segmental Quality," ESCA Workshop on Technology for Disabled Persons, Jun. 1993.

(List continued on next page.)

*Primary Examiner*—David R. Hudspeth
*Assistant Examiner*—Tálivaldis Ivars Šmits
*Attorney, Agent, or Firm*—Morrison & Foerster

[57] ABSTRACT

A speech-based system for assessing the psychological, physiological, or other characteristics of a test subject is described. The system includes a knowledge base that stores one or more speech models, where each speech model corresponds to a characteristic of a group of reference subjects. Signal processing circuitry, which may be implemented in hardware, software and/or firmware, compares the test speech parameters of a test subject with the speech models. In one embodiment, each speech model is represented by a statistical time-ordered series of frequency representations of the speech of the reference subjects. The speech model is independent of a priori knowledge of style parameters associated with the voice or speech. The system includes speech parameterization circuitry for generating the test parameters in response to the test subject's speech. This circuitry includes speech acquisition circuitry, which may be located remotely from the knowledge base. The system further includes output circuitry for outputting at least one indicator of a characteristic in response to the comparison performed by the signal processing circuitry. The characteristic may be time-varying, in which case the output circuitry outputs the characteristic in a time-varying manner. The output circuitry also may output a ranking of each output characteristic. In one embodiment, one or more characteristics may indicate the degree of sincerity of the test subject, where the degree of sincerity may vary with time. The system may also be employed to determine the effectiveness of treatment for a psychological or physiological disorder by comparing psychological or physiological characteristics, respectively, before and after treatment.

63 Claims, 29 Drawing Sheets

U.S. PATENT DOCUMENTS

| | | | |
|---|---|---|---|
| 4,020,567 | 5/1977 | Webster | 434/185 |
| 4,093,821 | 6/1978 | Williamson | 704/207 |
| 4,142,067 | 2/1979 | Williamson | 704/258 |
| 4,490,840 | 12/1984 | Jones | 704/276 |
| 4,675,904 | 6/1987 | Silverman | 704/203 |
| 4,752,889 | 6/1988 | Rappaport et al. | 706/11 |
| 4,943,933 | 7/1990 | Silverman | 706/20 |
| 5,148,483 | 9/1992 | Silverman | 704/274 |
| 5,351,338 | 9/1994 | Wigren | 704/219 |
| 5,369,727 | 11/1994 | Nomura et al. | 704/252 |
| 5,516,289 | 5/1996 | Quigley et al. | 434/106 |

OTHER PUBLICATIONS

Alan A. Wrench, et al. "A Speech Therapy Workstation for the Assessment of Segmental Quality: Voiceless Fricatives," European Conference on Speech Communication EUROSPEECH, Sept. 1993.

Frank Dellaert, et al. "Recognizing Emotion in Speech," Proc. ICSLP, Oct. 1996.

F. Plante, et al. "Speech Monitoring of Inefective Laryngitis," Proc. ICSLP, Oct. 1996.

Iain R. Murray, et al. "Synthesizing Emotions in Speech: Is it Time to Get Excited?", Proc. ICSLP, Oct. 1996.

Bukalov, A.V., et al., "Socionics, Mentology and Individual Psychology (Psychology of Personality)," International Institute for Socionics (1994).

Butcher, J.N., et al. (Hathaway, S.R., et al.), *Minnesota Multiphasic Personality Inventory (MMPI–2) Manual for Administration and Scoring*, University of Minnesota Press, Minneapolis, (1989).

Cairns, D.A., et al. "Nonlinear analysis and classification of speech under stressed conditions," Journal of the Acoustical Society of America, vol. 96, No. 6, pp. 3392–3400 (Dec. 1994).

Crocker, L.M., et al. *Introduction to Classical and Modern Test Theory*, New York: Holt, Rhinehart and Winston, pp. 461–455 (1986).

Filatov, E., *Socionica For You*, Siberian Chronograph, Novosiborsk City, (ISBN 5–87550–010–7) (1993).

Greene, R.L., *The MMPI–2/MMPI: An Interpretive Manual*, Chapter 6, Allyn an Bacon, pp. 231–285 (1991).

International Search Report, PCT/US98/05531 (Jul. 06, 1998) WO 98/41977.

Lee, C.H., et al., "Frame–Synchronous Network Search Algorithm for Connected Work Recognition," *IEEE Transactions on Acoustics, Speech, and Signal Processing*, vol. 37, No. 11, (Nov. 1989).

Luscher, M., *The Luscher Color Test*, Washington Square Press, Translated by I. Scott, pp. 1–3, 11–13, 60–81, 82–96 (1969).

Matsui, T., et al., "Comparison of Text–Independent Speaker Recognition Methods Using VQ–Distortion and Discrete/Continuous HMMS," Institute of Electrical and Electronics Engineers, Speech Processing 2, Audio, Neural Networks, Underwater Acoustics, San Francisco, CA. vol. 2, Conf. 17, pp. 157–160 (Mar. 23–26 1992).

Meyers, I.B., *Manual: A guide to the Development and Use of the Myers–Briggs Type Indicatior*, Consulting Psychological Press, Inc., Palo Alto, CA (1985).

Millon, T., Ph.D., et al., *MCMI–III Manual: Millon Clinical Multiaxial Inventory–III*, National Computer systems, Inc., Minneapolis, MN (1994).

Rabiner, L., et al., *Fundamentals of Speech Recognition*, Prentice Hall, pp. 112–117, 122–129, 271–274 (1993).

Yamada, T., et al., "Pattern Recognition of Emotion with Neural Network," Proceedings of the 1995 IEEE IECON: International Conference on Industrial Electronics, Control, and Instrumentation, Orlando, FLA., vol. 1, Conf. 21, pp. 183–187 (Nov. 6–Oct. 1995).

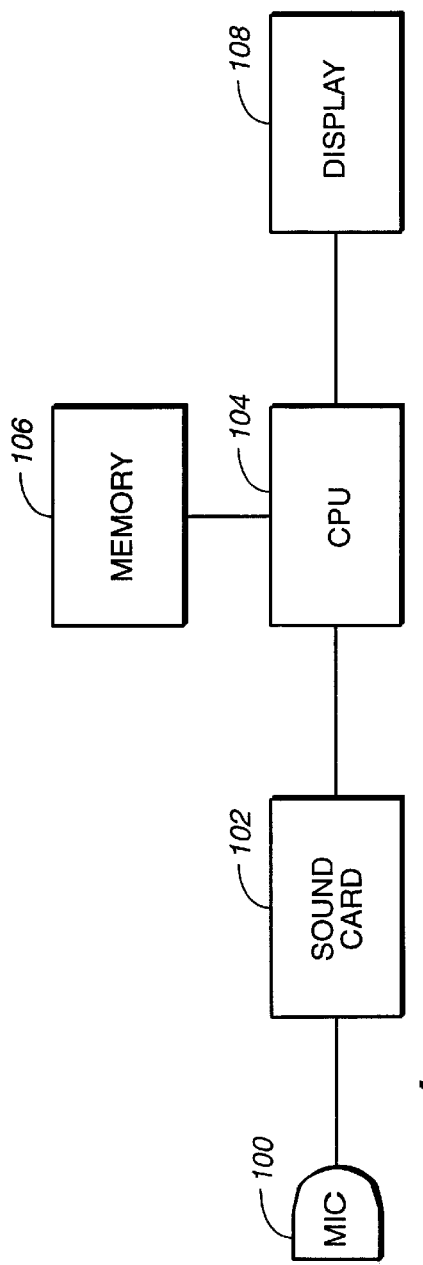
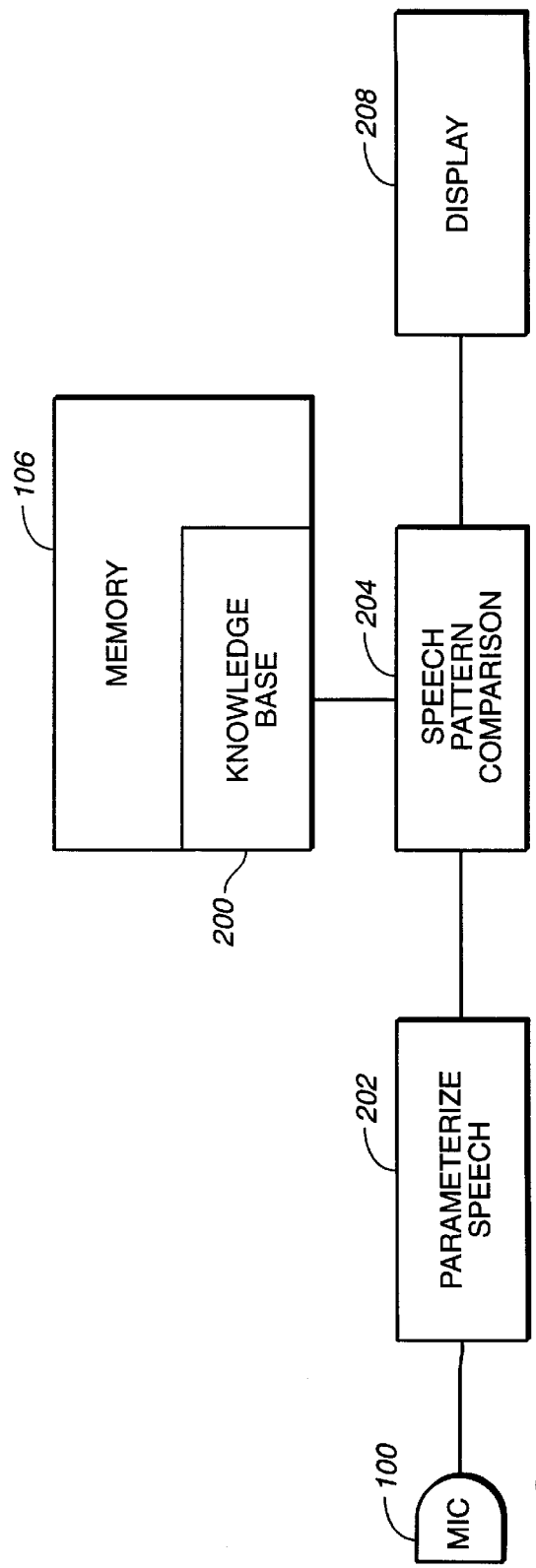

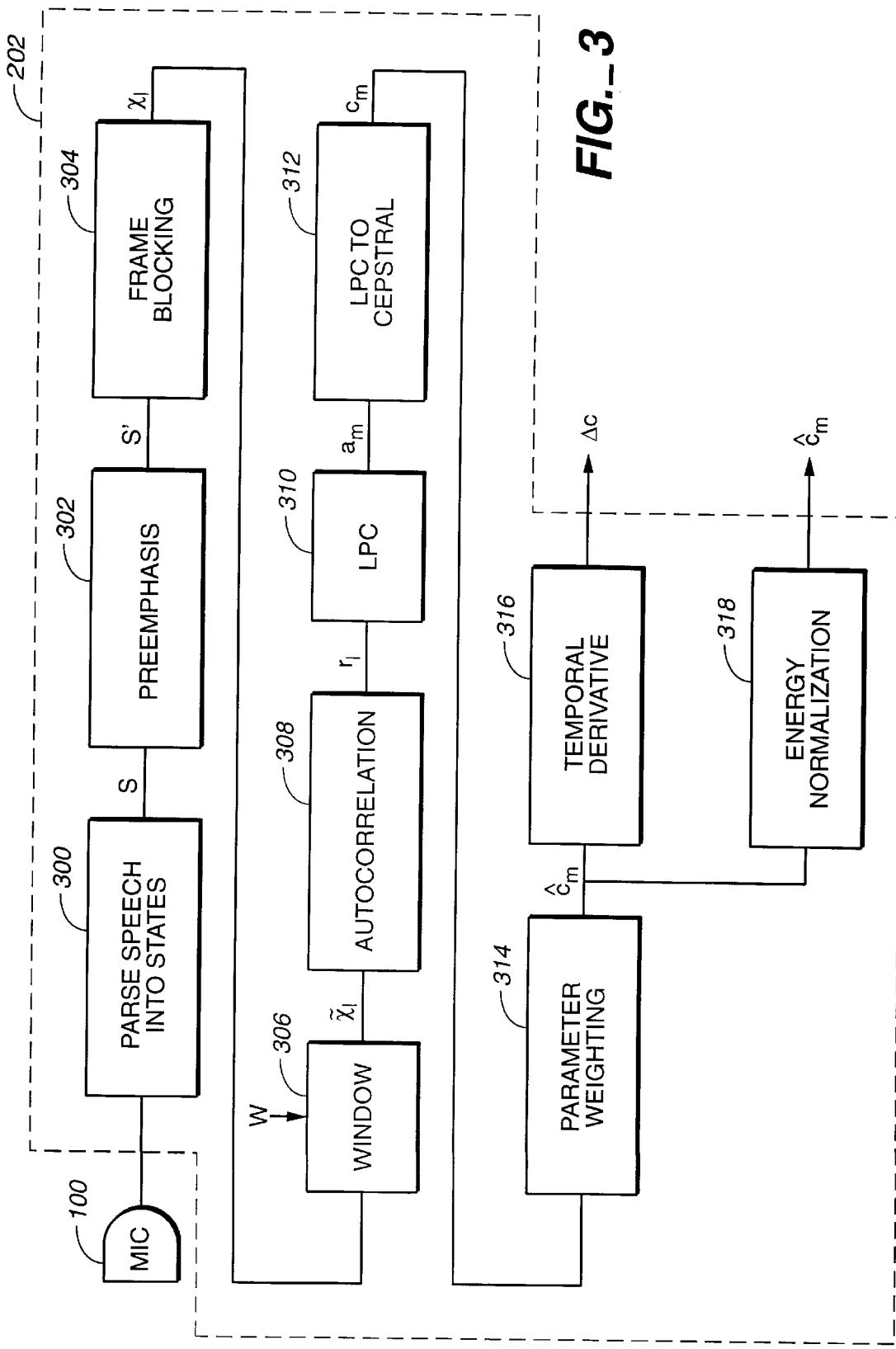

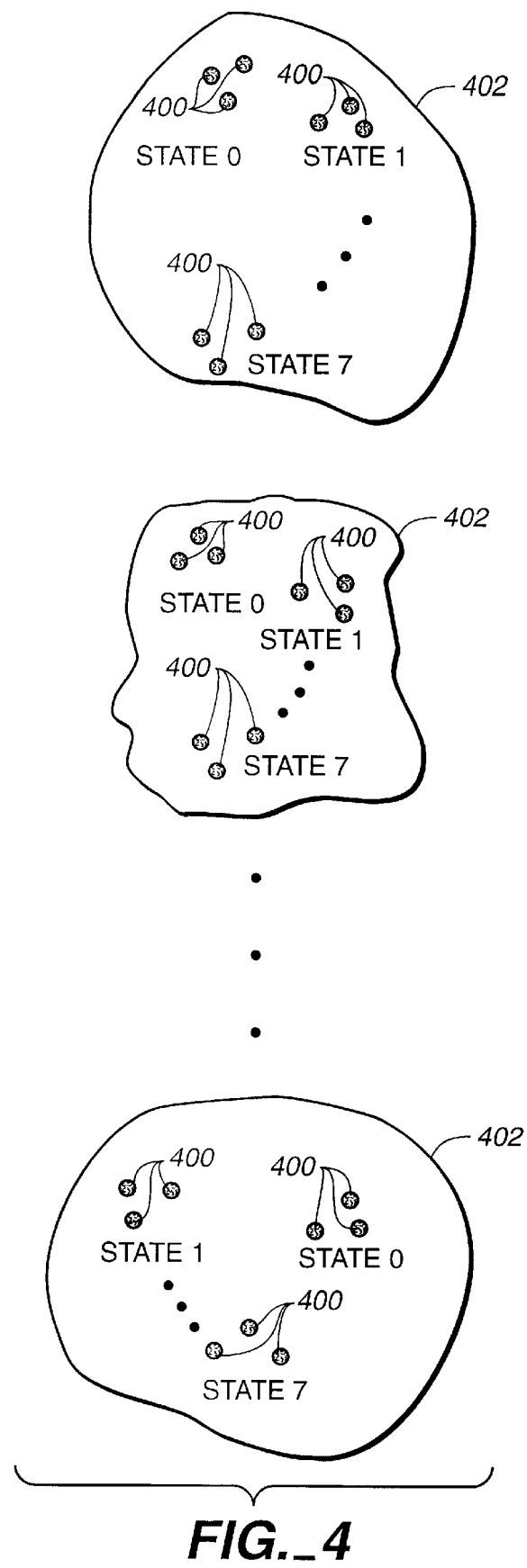
FIG._4

Name 0 (gray)
actual number of states 8 meanSegLen:
0: 12.69 1: 19.31 2: 22.61 3: 19.59 4: 16.19 5: 24.84 6: 24.74 7: 38.46
maxSegLen:
0: 32.00 1: 32.00 2: 32.00 3: 33.00 4: 33.00 5: 64.00 6: 63.00 7: 77.00
minSegLen:
0: 12.00 1: 14.00 2: 14.00 3: 12.00 4: 14.00 5: 16.00 6: 18.00 7: 21.00
meanSegEn:
0: 16.40 1: 20.78 2: 21.00 3: 20.74 4: 20.06 5: 20.35 6: 20.77 7: 19.63
maxSegEn:
0: 22.09 1: 24.88 2: 25.00 3: 24.49 4: 24.18 5: 25.00 6: 24.36 7: 23.09
minSegEn:
0: 12.67 1: 17.25 2: 17.25 3: 17.25 4: 17.24 5: 17.23 6: 17.35 7: 17.34 c (component's weight):
0> 0: 0.05  1: 0.08  2: 0.86
1> 0: 0.15  1: 0.07  2: 0.77
2> 0: 0.10  1: 0.65  2: 0.24
3> 0: 0.30  1: 0.45  2: 0.24
4> 0: 0.55  1: 0.38  2: 0.07
5> 0: 0.19  1: 0.16  2: 0.63
6> 0: 0.44  1: 0.18  2: 0.37
7> 0: 0.28  1: 0.61  2: 0.11

FIG._5A me (means vector):
0> 0: 12.00, 1: 16.40, 2: 22.09, 3: 12.67, 4: -0.00, 5: -0.01, 6: 0.00, 7: 0.00, 8: 0.00, 9: 15.52, 10: -0.00, 11: 0.00, 12: 0.00, 13: 0.00, 14: 0.00, 15: 4.02, 16: 0.00, 17: 0.00, 18: 0.00, 19: -0.00, 20: 0.00, 21: -0.00, 22: -0.00, 23: 0.00,
1> 0: 14.00, 1: 20.78, 2: 24.88, 3: 17.25, 4: 0.00, 5: 0.00, 6: 0.00, 7: -0.00, 8: 0.00, 9: -2.35, 10: 0.00, 11: 0.00, 12: 0.00, 13: 0.00, 14: 0.00, 15: 0.00, 16: -0.00, 17: 0.00, 18: 0.00, 19: -0.00, 20: 0.00, 21: 0.00, 22: -0.00, 23: 0.00,
2> 0: 14.00, 1: 21.00, 2: 25.00, 3: 17.25, 4: -0.00, 5: -0.00, 6: 0.00, 7: 0.00, 8: 0.00, 9: 0.00, 10: 0.00, 11: 0.00, 12: 0.00, 13: 0.00, 14: 0.00, 15: -0.00, 16: -0.00, 17: 0.00, 18: 0.00, 19: 0.00, 20: -0.00, 21: -0.00, 22: 0.00, 23: 0.00,
3> 0: 12.00, 1: 20.74, 2: 24.49, 3: 17.25, 4: 0.00, 5: 0.00, 6: -0.00, 7: 0.00, 8: -0.00, 9: -0.00, 10: 0.00, 11: 0.04, 12: 0.00, 13: -0.00, 14: 0.00, 15: 0.00, 16: 0.00, 17: 0.00, 18: -0.00, 19: -0.00, 20: 0.00, 21: 0.00, 22: -0.00, 23: 0.00,
4> 0: 14.00, 1: 20.06, 2: 24.18, 3: 17.24, 4: 0.00, 5: -0.00, 6: 0.00, 7: 0.00, 8: 0.00, 9: 0.00, 10: 0.00, 11: 0.00, 12: 0.00, 13: 0.00, 14: 0.00, 15: 0.00, 16: 0.00, 17: -0.00, 18: -0.00, 19: -0.00, 20: -0.00, 21: 0.00, 22: -0.00, 23: 0.00,
5> 0: 16.00, 1: 20.35, 2: 25.00, 3: 17.23, 4: 0.00, 5: 0.00, 6: 0.00, 7: 0.00, 8: 0.00, 9: 0.00, 10: -0.00, 11: 0.00, 12: -0.02, 13: -0.00, 14: 1.07, 15: 76.87, 16:120.87, 17: 0.00, 18: 0.00, 19: 0.00, 20: 0.00, 21: 0.00, 22: -0.00, 23: -0.00,
6> 0: 18.00, 1: 20.77, 2: 24.36, 3: 17.35, 4: 0.00, 5: 0.00, 6: 0.00, 7: 0.00, 8: 0.00, 9: 0.00, 10: 0.00, 11: 0.00, 12: 0.00, 13: 0.00, 14: 0.00, 15: 0.00, 16: -0.00, 17: 0.00, 18: -0.00, 19: 76.38, 20: -0.00, 21: -0.00, 22: 0.00, 23: 0.00,
7> 0: 21.00, 1: 19.63, 2: 23.09, 3: 17.34, 4: 0.00, 5: 0.00, 6: 0.00, 7: 0.00, 8: 0.00, 9: 0.00, 10: 0.00, 11: 0.00, 12: 0.00, 13: 0.00, 14: 0.00, 15: 0.00, 16: 0.00, 17: 0.00, 18: 0.00, 19: 0.00, 20: 0.00, 21: 0.00, 22: 0.00, 23: 0.00,

FIG._5B state transition matrix:
0.9267, 0.0733, 0.0000, 0.0000, 0.0000, 0.0000, 0.0000, 0.0000,
0.0000, 0.9481, 0.0519, 0.0000, 0.0000, 0.0000, 0.0000, 0.0000,
0.0000, 0.0000, 0.9581, 0.0419, 0.0000, 0.0000, 0.0000, 0.0000,
0.0000, 0.0000, 0.0000, 0.9478, 0.0522, 0.0000, 0.0000, 0.0000,
0.0000, 0.0000, 0.0000, 0.0000, 0.9491, 0.0509, 0.0000, 0.0000,
0.0000, 0.0000, 0.0000, 0.0000, 0.0000, 0.9702, 0.0298, 0.0000,
0.0000, 0.0000, 0.0000, 0.0000, 0.0000, 0.0000, 0.9708, 0.0292,
0.0000, 0.0000, 0.0000, 0.0000, 0.0000, 0.0000, 0.0000, 0.9792,

*FIG._5C*

Name 1(blue)
actual number of states 8 meanSegLen:
0: 12.19 1: 6.98 2: 7.59 3: 9.38 4: 9.76 5: 13.69 6: 8.62 7: 30.77
maxSegLen:
0: 15.00 1: 13.00 2: 17.00 3: 24.00 4: 23.00 5: 25.00 6: 23.00 7: 41.00
minSegLen:
0: 6.00 1: 5.00 2: 4.00 3: 6.00 4: 8.00 5: 9.00 6: 5.00 7: 2.00
meanSegEn:
0: 16.06 1: 19.84 2: 21.36 3: 20.73 4: 20.06 5: 20.87 6: 21.08 7: 19.30
maxSegEn:
0: 21.03 1: 24.51 2: 25.00 3: 25.00 4: 25.00 5: 23.23 6: 23.79 7: 22.07
minSegEn:
0: 11.90 1: 12.14 2: 13.57 3: 15.66 4: 12.27 5: 14.74 6: 13.09 7: 14.73 c (component's weight):
0> 0: 0.60 1: 0.33 2: 0.03
1> 0: 0.09 1: 0.83 2: 0.06
2> 0: 0.18 1: 0.36 2: 0.44
3> 0: 0.48 1: 0.24 2: 0.27
4> 0: 0.34 1: 0.47 2: 0.18
5> 0: 0.23 1: 0.72 2: 0.04
6> 0: 0.22 1: 0.74 2: 0.03
7> 0: 0.12 1: 0.71 2: 0.16

FIG._5D me (means vector):

0> 0: 6.00, 1: 16.06, 2: 21.03, 3: 11.90, 4: 0.00, 5: 0.00, 6: 0.00, 7: 0.00, 8: 0.00, 9: 0.00, 10: 0.00,
11: 0.00, 12: 0.00, 13: 0.00, 14: 0.00, 15: 0.00, 16: 0.00, 17: 0.00, 18: 0.00, 19: 0.00, 20: 0.00,
21: 4.30, 22: 0.00, 23: 0.00,
1> 0: 5.00, 1: 19.84, 2: 24.51, 3: 12.14, 4: 0.00, 5: 0.00, 6: 0.00, 7: 0.00, 8: 0.00, 9: −0.00, 10:
0.00, 11: −0.00, 12: 0.00, 13: 0.00, 14: −0.00, 15: 0.00, 16: 0.69, 17: 0.00, 18: −0.00, 19: 0.00, 20:
−0.00, 21: 0.00, 22: 0.00, 23: 0.00,
2> 0: 4.00, 1: 21.36, 2: 25.00, 3: 13.57, 4: 0.00, 5: −0.00, 6: 0.00, 7: 0.00, 8: −0.00, 9: 0.00, 10:
0.00, 11: 0.00, 12: 0.00, 13: 0.00, 14: 0.00, 15: 0.00, 16: 0.00, 17: −456.49, 18: 0.00, 19: −0.00, 20:
0.00, 21: 0.00, 22: 0.00, 23: 0.00,
3> 0: 6.00, 1: 20.73, 2: 25.00, 3: 15.66, 4: 0.00, 5: −0.00, 6: −0.00, 7: 0.00, 8: 0.00, 9: 0.00, 10:
0.00, 11: 0.00, 12: 0.00, 13: 0.00, 14: −0.39, 15: 0.00, 16: 0.00, 17: 0.00, 18: −0.00, 19: 0.00, 20:
−0.00, 21: −0.00, 22: −0.00, 23: 0.00,
4> 0: 8.00, 1: 20.06, 2: 25.00, 3: 12.27, 4: −0.00, 5: 0.00, 6: 0.00, 7: −0.00, 8: 0.00, 9: 0.00, 10:
0.00, 11: −0.00, 12: 0.00, 13: 0.00, 14: 0.00, 15: −0.00, 16: 0.00, 17: 0.00, 18: 0.00, 19: −0.00, 20:
0.00, 21: 0.00, 22: −0.00, 23: 0.00,
5> 0: 9.00, 1: 20.87, 2: 23.23, 3: 14.74, 4: 0.00, 5: 0.00, 6: 0.00, 7: 0.00, 8: 0.00, 9: −0.00, 10:
0.00, 11: 0.00, 12: 0.00, 13: 0.00, 14: 0.00, 15: 0.00, 16: 0.00, 17: 42.31, 18: −0.00, 19: 0.00, 20:
0.00, 21: 0.00, 22: 0.00, 23: 0.00,
6> 0: 5.00, 1: 21.08, 2: 23.79, 3: 13.09, 4: −0.00, 5: −0.00, 6: 0.00, 7: 0.00, 8: −0.00, 9: −0.03, 10: −
0.00, 11: 0.00, 12: 0.00, 13: 0.00, 14: 0.00, 15: −26.16, 16: 0.00, 17: −0.00, 18: 0.00, 19: 0.00, 20:
0.00, 21: 0.00, 22: 0.00, 23: 0.00,
7> 0: 2.00, 1: 19.30, 2: 22.07, 3: 14.73, 4: 0.00, 5: 0.00, 6: 0.00, 7: 0.00, 8: 0.00, 9: 0.00, 10: 0.00,
11: 0.00, 12: 0.00, 13: 0.00, 14: 0.00, 15: 0.00, 16: 0.00, 17: 0.00, 18: 0.00, 19: 0.00, 20: 0.00,
21: 0.00, 22: 0.00, 23: 0.00,

FIG._5E state transition matrix:

| 0.9167, | 0.0833, | 0.0000, | 0.0000, | 0.0000, | 0.0000, | 0.0000, | 0.0000, |
|---|---|---|---|---|---|---|---|
| 0.0000, | 0.8905, | 0.1095, | 0.0000, | 0.0000, | 0.0000, | 0.0000, | 0.0000, |
| 0.0000, | 0.0000, | 0.9130, | 0.0870, | 0.0000, | 0.0000, | 0.0000, | 0.0000, |
| 0.0000, | 0.0000, | 0.0000, | 0.9199, | 0.0801, | 0.0000, | 0.0000, | 0.0000, |
| 0.0000, | 0.0000, | 0.0000, | 0.0000, | 0.9150, | 0.0850, | 0.0000, | 0.0000, |
| 0.0000, | 0.0000, | 0.0000, | 0.0000, | 0.0000, | 0.9395, | 0.0605, | 0.0000, |
| 0.0000, | 0.0000, | 0.0000, | 0.0000, | 0.0000, | 0.0000, | 0.9208, | 0.0792, |
| 0.0000, | 0.0000, | 0.0000, | 0.0000, | 0.0000, | 0.0000, | 0.0000, | 0.9505, |

FIG._5F

Name 2 (green)
actual number of states 8 meanSegLen:
0: 18.21 1: 14.27 2: 21.30 3: 22.21 4: 22.88 5: 27.58 6: 30.06 7: 43.69
maxSegLen:
0: 31.00 1: 29.00 2: 33.00 3: 31.00 4: 30.00 5: 32.00 6: 89.00 7: 94.00
minSegLen:
0: 14.00 1: 11.00 2: 13.00 3: 13.00 4: 15.00 5: 15.00 6: 17.00 7: 2.00
meanSegEn:
0: 15.29 1: 20.57 2: 19.88 3: 19.92 4: 19.82 5: 19.24 6: 18.93 7: 18.83
maxSegEn:
0: 21.73 1: 24.11 2: 23.48 3: 24.22 4: 24.53 5: 23.53 6: 23.88 7: 23.38
minSegEn:
0: 11.96 1: 16.57 2: 16.57 3: 16.58 4: 16.57 5: 16.57 6: 16.56 7: 16.56 c (component's weight):
0> 0: 0.28 1: 0.40 2: 0.32
1> 0: 0.09 1: 0.59 2: 0.32
2> 0: 0.64 1: 0.14 2: 0.21
3> 0: 0.11 1: 0.69 2: 0.19
4> 0: 0.30 1: 0.33 2: 0.35
5> 0: 0.19 1: 0.31 2: 0.49
6> 0: 0.58 1: 0.27 2: 0.14
7> 0: 0.25 1: 0.35 2: 0.39

FIG._5G me (means vector):
0> 0: 14.00, 1: 15.29, 2: 21.73, 3: 11.96, 4: 0.00, 5: 0.00, 6: 0.00, 7: 0.00, 8: 0.00, 9: 0.00, 10: -0.00, 11: 0.00, 12: 0.00, 13: -0.00, 14: -0.00, 15: 0.00, 16: 0.00, 17: 0.00, 18: 0.00, 19: 0.00, 20: 0.00, 21: 0.00, 22: 0.00, 23: 0.00,
1> 0: 11.00, 1: 20.57, 2: 24.11, 3: 16.57, 4: -5.06, 5: 0.00, 6: 0.00, 7: 0.00, 8: 0.00, 9: 0.00, 10: 0.00, 11: 0.00, 12: -0.01, 13: -0.00, 14: 0.00, 15: 0.00, 16: 0.00, 17: 0.00, 18: 0.00, 19: -0.00, 20: 0.00, 21: 0.00, 22: 0.00, 23: 0.00,
2> 0: 13.00, 1: 19.88, 2: 23.48, 3: 16.57, 4: 0.00, 5: 0.00, 6: 0.00, 7: 0.00, 8: -0.00, 9: 0.00, 10: -0.00, 11: -0.00, 12: 0.00, 13: 0.00, 14: 0.00, 15: 0.00, 16: -0.00, 17: -0.00, 18: -9.55, 19: 0.00, 20: 0.00, -0.00, 21: -0.00, 22: 0.00, 23: 0.00, -0.01,
3> 0: 13.00, 1: 19.92, 2: 24.22, 3: 16.58, 4: 0.00, 5: 0.00, 6: 0.00, 7: 0.00, 8: 0.00, 9: 0.00, 10: 0.00, 11: 0.00, 12: 0.00, 13: 0.00, 14: -0.00, 15: -0.00, 16: -0.00, 17: 0.00, 18: 0.00, 19: 0.00, 20: 0.00, 0.00, 21: -0.00, 22: 0.00, 23: 0.00,
4> 0: 15.00, 1: 19.82, 2: 24.53, 3: 16.57, 4: -0.00, 5: 0.00, 6: 0.00, 7: -0.00, 8: 0.00, 9: 0.00, 10: 0.00, 11: 0.00, 12: 0.00, 13: -0.00, 14: -0.00, 15: -0.00, 16: -0.00, 17: 0.00, 18: 0.00, 19: 0.00, 20: 0.00, -0.00, 21: 0.00, 22: 0.29, 23: -0.00,
5> 0: 15.00, 1: 19.24, 2: 23.53, 3: 16.57, 4: -0.00, 5: 0.00, 6: -0.00, 7:110.13, 8: -0.00, 9: 5.60, 10: -0.01, 11: 0.00, 12: 0.00, 13: 0.00, 14: 0.02, 15: -0.00, 16: 0.00, 17: -0.00, 18: 0.00, 19: -0.00, 20: 0.00, 0.00, 21: -0.00, 22: 0.06, 23: 0.00,
6> 0: 17.00, 1: 18.93, 2: 23.88, 3: 16.56, 4: 0.00, 5: 0.00, 6: 0.00, 7: 0.00, 8: 0.00, 9: 0.00, 10: 0.00, 11: 0.00, 12: 0.00, 13: 0.00, 14: 0.00, 15: 0.00, 16: 0.00, 17: 0.00, 18: 0.00, 19: 0.00, 20: 0.00, 0.00, 21: 0.07, 22: 0.00, 23: 0.00,
7> 0: 2.00, 1: 18.83, 2: 23.38, 3: 16.56, 4: 0.00, 5: 0.00, 6: 0.00, 7: 0.00, 8: 0.00, 9: 0.00, 10: 0.00, 11: 0.00, 12: 0.00, 13: 0.00, 14: 0.00, 15: 0.00, 16: 0.00, 17: 0.00, 18: 0.00, 19: 0.00, 20: 0.00, 0.00, 21: 0.00, 22: 0.00, 23: 0.00,

FIG._5H state transition matrix:
0.9411, 0.0589, 0.0000, 0.0000, 0.0000, 0.0000, 0.0000, 0.0000,
0.0000, 0.9413, 0.0587, 0.0000, 0.0000, 0.0000, 0.0000, 0.0000,
0.0000, 0.0000, 0.9606, 0.0394, 0.0000, 0.0000, 0.0000, 0.0000,
0.0000, 0.0000, 0.0000, 0.9540, 0.0460, 0.0000, 0.0000, 0.0000,
0.0000, 0.0000, 0.0000, 0.0000, 0.9549, 0.0451, 0.0000, 0.0000,
0.0000, 0.0000, 0.0000, 0.0000, 0.0000, 0.9589, 0.0411, 0.0000,
0.0000, 0.0000, 0.0000, 0.0000, 0.0000, 0.0000, 0.9764, 0.0236,
0.0000, 0.0000, 0.0000, 0.0000, 0.0000, 0.0000, 0.0000, 0.9784,

*FIG._5I*

Name 3 (red)
actual number of states 8 meanSegLen:
0: 9.80 1: 10.86 2: 9.53 3: 11.25 4: 12.07 5: 12.69 6: 11.23 7: 31.20
maxSegLen:
0: 35.00 1: 29.00 2: 29.00 3: 28.00 4: 31.00 5: 29.00 6: 31.00 7:146.00
minSegLen:
0: 7.00 1: 7.00 2: 8.00 3: 8.00 4: 8.00 5: 8.00 6: 9.00 7: 11.00
meanSegEn:
0: 14.79 1: 19.34 2: 21.13 3: 19.42 4: 20.11 5: 20.55 6: 19.45 7: 19.33
maxSegEn:
0: 20.69 1: 24.66 2: 24.78 3: 24.32 4: 24.87 5: 24.73 6: 23.91 7: 24.65
minSegEn:
0: 11.82 1: 16.45 2: 16.64 3: 16.46 4: 16.43 5: 16.43 6: 16.44 7: 16.44 c (component's weight):
0> 0: 0.23 1: 0.52 2: 0.24
1> 0: 0.32 1: 0.11 2: 0.56
2> 0: 0.05 1: 0.56 2: 0.38
3> 0: 0.12 1: 0.50 2: 0.37
4> 0: 0.12 1: 0.22 2: 0.65
5> 0: 0.76 1: 0.09 2: 0.14
6> 0: 0.10 1: 0.31 2: 0.58
7> 0: 0.46 1: 0.34 2: 0.19

*FIG._5J* me (means vector):
0> 0: 7.00, 1: 14.79, 2: 20.69, 3: 11.82, 4: 0.00, 5: 0.00, 6: -0.00, 7: 0.00, 8: -0.00, 9: 0.00, 10:
0.26, 11: -0.00, 12: 0.00, 13: 2.96, 14: 0.00, 15: 4.10, 16: 0.00, 17: -0.00, 18: 0.00, 19: 0.00, 20:
0.00, 21: 0.00, 22: -0.00, 23: 0.00,
1> 0: 7.00, 1: 19.34, 2: 24.66, 3: 16.45, 4: 0.00, 5: -0.00, 6: 0.00, 7: 0.17, 8: 0.00, 9: 0.00, 10:
0.00, 11: 0.00, 12: 0.00, 13: 0.00, 14: 0.00, 15: 0.00, 16: -0.00, 17: 0.00, 18: 0.00, 19: 0.22,
20:399.49, 21: 0.00, 22: 0.00, 23: 0.00,
2> 0: 8.00, 1: 21.13, 2: 24.78, 3: 16.64, 4: -0.00, 5: 0.00, 6: 0.00, 7: 0.00, 8: 0.00, 9: 0.00, 10:
0.00, 11: 0.00, 12: 0.00, 13: 0.00, 14: 0.00, 15: -0.03, 16: -0.00, 17: 0.00, 18: 0.00, 19: 0.00, 20:
0.00, 21: -0.00, 22: 0.00, 23: 0.00,
3> 0: 8.00, 1: 19.42, 2: 24.32, 3: 16.46, 4: 0.00, 5: 0.00, 6: 0.00, 7: -0.00, 8: 0.00, 9: 0.00, 10:
0.00, 11: 0.00, 12: 0.00, 13: 0.00, 14: 0.00, 15: -0.00, 16: -0.00, 17: 0.00, 18: 0.00, 19: 0.00, 20:
0.00, 21: 0.26, 22: 0.00, 23: 0.00,
4> 0: 8.00, 1: 20.11, 2: 24.87, 3: 16.43, 4: 0.00, 5: 0.00, 6: 0.00, 7: -0.00, 8: -0.00, 9: 0.00, 10:
0.00, 11: 0.00, 12: 0.00, 13: -0.00, 14: -0.00, 15: 0.00, 16: 0.00, 17: 0.00, 18: 0.00, 19: 0.00, 20:
0.00, 21: 0.00, 22: -0.00, 23: 0.00,
5> 0: 8.00, 1: 20.55, 2: 24.73, 3: 16.43, 4: 0.00, 5:-908.97, 6: -0.00, 7: 0.00, 8: -0.00, 9: 0.00, 10:
0.00, 11: 0.00, 12: 0.00, 13: 0.00, 14: 0.00, 15: 0.00, 16: 0.00, 17: 0.00, 18: 0.00, 19: -0.00, 20:
0.00, 21: 0.00, 22: 0.00, 23: 0.00,
6> 0: 9.00, 1: 19.45, 2: 23.91, 3: 16.44, 4: 0.00, 5: -0.00, 6: 0.00, 7: 0.00, 8: -0.00, 9: 0.00, 10:
0.00, 11: -0.00, 12: 0.00, 13:-60.06, 14: 52.31, 15: -0.00, 16: 0.00, 17: 0.00, 18: -0.00, 19: 0.00,
20: 59.94, 21: 0.00, 22: -0.00, 23: -0.00,
7> 0: 11.00, 1: 19.33, 2: 24.65, 3: 16.44, 4: 0.00, 5: 0.00, 6: 0.00, 7: 0.00, 8: 0.00, 9: 0.00, 10:
0.00, 11: 0.00, 12: 0.00, 13: 0.00, 14: 0.00, 15: 0.00, 16: 0.00, 17: 0.00, 18: 0.00, 19: 0.00, 20:
0.00, 21: 0.00, 22: 0.00, 23: 0.00,

FIG._5K state transition matrix:
0.9247, 0.0753, 0.0000, 0.0000, 0.0000, 0.0000, 0.0000, 0.0000,
0.0000, 0.9471, 0.0529, 0.0000, 0.0000, 0.0000, 0.0000, 0.0000,
0.0000, 0.0000, 0.9413, 0.0587, 0.0000, 0.0000, 0.0000, 0.0000,
0.0000, 0.0000, 0.0000, 0.9438, 0.0562, 0.0000, 0.0000, 0.0000,
0.0000, 0.0000, 0.0000, 0.0000, 0.9503, 0.0497, 0.0000, 0.0000,
0.0000, 0.0000, 0.0000, 0.0000, 0.0000, 0.9340, 0.0660, 0.0000,
0.0000, 0.0000, 0.0000, 0.0000, 0.0000, 0.0000, 0.9448, 0.0552,
0.0000, 0.0000, 0.0000, 0.0000, 0.0000, 0.0000, 0.0000, 0.9838.

FIG._5L

Name 4 (yellow)
actual number of states 8 meanSegLen:
0: 9.52 1: 10.39 2: 7.74 3: 9.71 4: 7.74 5: 12.74 6: 15.32 7: 18.83
maxSegLen:
0: 27.00 1: 27.00 2: 28.00 3: 30.00 4: 30.00 5: 39.00 6: 82.00 7:115.00
minSegLen:
0: 5.00 1: 3.00 2: 5.00 3: 3.00 4: 3.00 5: 5.00 6: 7.00 7: 3.00
meanSegEn:
0: 20.08 1: 23.49 2: 22.47 3: 22.45 4: 22.69 5: 22.86 6: 21.62 7: 22.29
maxSegEn:
0: 24.43 1: 25.00 2: 25.00 3: 25.00 4: 24.69 5: 24.60 6: 22.71 7: 24.87
minSegEn:
0: 16.47 1: 20.16 2: 20.21 3: 20.17 4: 20.49 5: 21.16 6: 20.15 7: 20.27 c (component's weight):
0> 0: 0.04 1: 0.03 2: 0.92
1> 0: 0.92 1: 0.03 2: 0.04
2> 0: 0.81 1: 0.05 2: 0.12
3> 0: 0.85 1: 0.09 2: 0.05
4> 0: 0.45 1: 0.22 2: 0.32
5> 0: 0.55 1: 0.34 2: 0.09
6> 0: 0.36 1: 0.60 2: 0.03
7> 0: 0.18 1: 0.68 2: 0.13

FIG._5M me (means vector):

0> 0: 5.00, 1: 20.08, 2: 24.43, 3: 16.47, 4: 0.00, 5: 0.00, 6: 0.12, 7: -0.00, 8: 0.00, 9: 0.00, 10: -0.00, 11: 0.00, 12: -0.00, 13: -0.00, 14: 0.00, 15: 0.00, 16: 0.00, 17: 0.00, 18: -0.68, 19: -0.00, 20: 0.00, 21: -0.00, 22: -0.00, 23: 0.02,

1> 0: 3.00, 1: 23.49, 2: 25.00, 3: 20.16, 4: -0.00, 5: 0.00, 6: 0.00, 7: 0.00, 8: 0.00, 9: -0.00, 10: 0.00, 11: 0.00, 12: 0.00, 13: 0.00, 14: 0.00, 15: 0.00, 16: 0.00, 17: 0.00, 18: 0.00, 19: 0.00, 20: 0.00, 21: -33.69, 22: -0.00, 23: 0.00,

2> 0: 5.00, 1: 22.47, 2: 25.00, 3: 20.21, 4: 0.00, 5: 0.00, 6: -0.00, 7: -0.00, 8: 0.00, 9: 0.00, 10: 0.00, 11: -0.00, 12: 0.00, 13: 0.00, 14: 0.00, 15: 0.00, 16: 0.00, 17: 0.00, 18: 2.34, 19: 0.00, 20: 0.00, 21: 0.00, 22: 19.28, 23: -0.00,

3> 0: 3.00, 1: 22.45, 2: 25.00, 3: 20.17, 4: -0.21, 5: 0.00, 6: 0.00, 7: 0.00, 8: 0.00, 9: 0.00, 10: 0.00, 11: 0.00, 12: 0.00, 13: 0.00, 14: 0.00, 15: 0.00, 16: 0.01, 17: -0.00, 18: 0.00, 19: 0.00, 20: 0.00, 21: 0.00, 22: -0.00, 23: 0.00,

4> 0: 3.00, 1: 22.69, 2: 24.69, 3: 20.49, 4: 0.00, 5: 0.00, 6: -0.00, 7: -0.00, 8: 1.98, 9: -0.00, 10: -0.00, 11: -0.00, 12: -0.12, 13: 0.00, 14: -0.00, 15: 0.00, 16: -0.00, 17: -360.48, 18: -0.00, 19: -0.00, 20: 0.00, 21: -0.00, 22: 0.00, 23: 0.00,

5> 0: 5.00, 1: 22.86, 2: 24.60, 3: 21.16, 4: -0.00, 5: 0.00, 6: -73.60, 7: 0.00, 8: 0.00, 9: 0.00, 10: 0.00, 11: -0.00, 12: 0.00, 13: 0.00, 14: -0.02, 15: 0.00, 16: 0.00, 17: -0.00, 18: 0.00, 19: 0.47, 20: 0.00, 21: 0.00, 22: 0.00, 23: 0.00,

6> 0: 7.00, 1: 21.62, 2: 22.71, 3: 20.15, 4: -0.00, 5: 0.00, 6: 0.00, 7: 0.00, 8: 0.00, 9: 470.50, 10: 0.00, 11: -0.00, 12: 0.00, 13: 0.36, 14: -0.00, 15: 0.00, 16: 0.00, 17: 0.00, 18: 0.00, 19: 0.00, 20: 0.00, 21: -916.98, 22: 0.00, 23: -0.00,

7> 0: 3.00, 1: 22.29, 2: 24.87, 3: 20.27, 4: 0.00, 5: 0.00, 6: 0.00, 7: 0.00, 8: 0.00, 9: 0.00, 10: 0.00, 11: 0.00, 12: 0.00, 13: 0.00, 14: 0.00, 15: 0.00, 16: 0.00, 17: 0.00, 18: 0.00, 19: 0.00, 20: 0.00, 21: 0.00, 22: 0.00, 23: 0.00,

FIG._5N state transition matrix:

| 0.9140, | 0.0860, | 0.0000, | 0.0000, | 0.0000, | 0.0000, | 0.0000, |
|---|---|---|---|---|---|---|
| 0.0000, | 0.9192, | 0.0808, | 0.0000, | 0.0000, | 0.0000, | 0.0000, |
| 0.0000, | 0.0000, | 0.9049, | 0.0951, | 0.0000, | 0.0000, | 0.0000, |
| 0.0000, | 0.0000, | 0.0000, | 0.9035, | 0.0965, | 0.0000, | 0.0000, |
| 0.0000, | 0.0000, | 0.0000, | 0.0000, | 0.9184, | 0.0816, | 0.0000, |
| 0.0000, | 0.0000, | 0.0000, | 0.0000, | 0.0000, | 0.9290, | 0.0710, |
| 0.0000, | 0.0000, | 0.0000, | 0.0000, | 0.0000, | 0.0000, | 0.9672, | 0.0328, |
| 0.0000, | 0.0000, | 0.0000, | 0.0000, | 0.0000, | 0.0000, | 0.0000, | 0.9546, |

FIG._50

Name 5(violet)
actual number of states 8 meanSegLen:
0: 10.36  1: 13.70  2: 12.19  3: 15.67  4: 17.89  5: 16.47  6: 30.33  7: 30.96
maxSegLen:
0: 27.00  1: 31.00  2: 32.00  3: 33.00  4: 33.00  5:116.00  6:127.00  7:125.00
minSegLen:
0: 8.00  1: 8.00  2: 9.00  3: 9.00  4: 10.00  5: 12.00  6: 10.00  7: 2.00
meanSegEn:
0: 18.01  1: 20.21  2: 21.50  3: 19.36  4: 19.07  5: 20.07  6: 19.91  7: 19.32
maxSegEn:
0: 19.79  1: 24.64  2: 25.00  3: 23.08  4: 23.08  5: 24.20  6: 23.63  7: 23.11
minSegEn:
0: 17.80  1: 17.81  2: 17.87  3: 17.81  4: 17.81  5: 17.81  6: 17.81  7: 17.79 c (component's weight):
0> 0: 0.07  1: 0.86  2: 0.06
1> 0: 0.40  1: 0.15  2: 0.43
2> 0: 0.19  1: 0.08  2: 0.71
3> 0: 0.84  1: 0.07  2: 0.06
4> 0: 0.58  1: 0.33  2: 0.08
5> 0: 0.44  1: 0.46  2: 0.09
6> 0: 0.70  1: 0.24  2: 0.06
7> 0: 0.71  1: 0.08  2: 0.21

FIG._5P me (means vector):

0> 0: 8.00, 1: 18.01, 2: 19.79, 3: 17.80, 4: 0.00, 5: -0.00, 6: -0.00, 7: -0.00, 8: 0.00, 9: 0.00, 10: -0.01, 11: -0.00, 12: -0.00, 13: -0.00, 14: 0.00, 15: 0.00, 16: 0.00, 17: 0.00, 18: 0.00, 19:270.51, 20: 0.78, 21: -0.00, 22: 0.00, 23: 0.00,

1> 0: 8.00, 1: 20.21, 2: 24.64, 3: 17.81, 4: -0.00, 5: 0.00, 6: 0.00, 7: 0.00, 8: 0.00, 9: -0.00, 10: -0.04, 11: 0.00, 12: 0.00, 13: -0.00, 14: 0.00, 15: -0.00, 16: 0.00, 17: -0.00, 18: 0.00, 19: 0.00, 20: 0.00, 21: 0.00, 22: 0.00, 23: 0.00,

2> 0: 9.00, 1: 21.50, 2: 25.00, 3: 17.87, 4: 0.00, 5: 0.00, 6: 0.00, 7: 0.00, 8: -0.00, 9: -0.00, 10: -0.00, 11: -0.00, 12: 0.00, 13: 0.00, 14: 0.00, 15: -0.00, 16: -0.00, 17: 0.00, 18: -0.00, 19:-10.05, 20: 0.00, 21: 0.00, 22: 0.00, 23:223.74,

3> 0: 9.00, 1: 19.36, 2: 23.08, 3: 17.81, 4: -0.01, 5: 0.00, 6: 0.00, 7: 0.00, 8: -0.00, 9: -0.00, 10: 0.00, 11: -0.00, 12: 0.00, 13: 0.00, 14: 0.00, 15: 0.00, 16: 0.00, 17: 0.00, 18: 0.00, 19: -0.00, 20: -0.00, 21: 0.00, 22: 0.00, 23: 0.00,

4> 0: 10.00, 1: 19.07, 2: 23.08, 3: 17.81, 4: 0.00, 5: 0.00, 6: -0.00, 7: 0.00, 8: 0.00, 9: 0.00, 10: 0.00, 11: 0.00, 12: 0.00, 13: 0.00, 14: 0.00, 15: 0.00, 16: 0.00, 17: 0.00, 18: 0.00, 19: 0.00, 20: -0.00, 21: 0.00, 22: 0.00, 23: -0.00,

5> 0: 12.00, 1: 20.07, 2: 24.20, 3: 17.81, 4: -0.00, 5: 0.05, 6: -0.00, 7: 0.00, 8: 0.00, 9: -0.00, 10: 0.00, 11: 0.00, 12: 1.81, 13: -0.00, 14: -0.00, 15: -0.00, 16: -0.00, 17: -0.00, 18: 0.00, 19: 0.00, 20: 0.00, 21: -0.00, 22: 0.00, 23: 0.00,

6> 0: 10.00, 1: 19.91, 2: 23.63, 3: 17.81, 4: -0.00, 5: 0.00, 6: 0.00, 7: -0.00, 8: 0.00, 9: -0.00, 10: 0.00, 11: 0.01, 12: 0.00, 13: 0.00, 14: 0.00, 15: 0.00, 16: 0.00, 17: 0.00, 18:-349.47, 19:-715.00, 20: 0.00, 21: 0.00, 22: -0.00, 23: 0.00,

7> 0: 2.00, 1: 19.32, 2: 23.11, 3: 17.79, 4: 0.00, 5: 0.00, 6: 0.00, 7: -0.00, 8: 0.00, 9: 0.00, 10: 0.00, 11: 0.00, 12: 0.00, 13: 0.00, 14: 0.00, 15: 0.00, 16: 0.00, 17: 0.00, 18: 0.00, 19: 0.00, 20: 0.00, 21: 0.00, 22: 0.00, 23: 0.00,

FIG._5Q state transition matrix:

| | | | | | | | |
|---|---|---|---|---|---|---|---|
| 0.9152, | 0.0848, | 0.0000, | 0.0000, | 0.0000, | 0.0000, | 0.0000, | 0.0000, |
| 0.0000, | 0.9400, | 0.0600, | 0.0000, | 0.0000, | 0.0000, | 0.0000, | 0.0000, |
| 0.0000, | 0.0000, | 0.9420, | 0.0580, | 0.0000, | 0.0000, | 0.0000, | 0.0000, |
| 0.0000, | 0.0000, | 0.0000, | 0.9467, | 0.0533, | 0.0000, | 0.0000, | 0.0000, |
| 0.0000, | 0.0000, | 0.0000, | 0.0000, | 0.9521, | 0.0479, | 0.0000, | 0.0000, |
| 0.0000, | 0.0000, | 0.0000, | 0.0000, | 0.0000, | 0.9711, | 0.0289, | 0.0000, |
| 0.0000, | 0.0000, | 0.0000, | 0.0000, | 0.0000, | 0.0000, | 0.9847, | 0.0153, |
| 0.0000, | 0.0000, | 0.0000, | 0.0000, | 0.0000, | 0.0000, | 0.0000, | 0.9457, |

FIG._5R

Name 6 (brown)
actual number of states 8 meanSegLen:
0: 13.63  1: 9.15  2: 8.75  3: 11.15  4: 12.31  5: 10.08  6: 11.75  7: 22.87
maxSegLen:
0: 15.00  1: 13.00  2: 14.00  3: 15.00  4: 15.00  5: 15.00  6: 22.00  7: 25.00
minSegLen:
0: 11.00  1: 6.00  2: 8.00  3: 9.00  4: 7.00  5: 7.00  6: 9.00  7: 11.00
meanSegEn:
0: 17.28  1: 21.75  2: 20.74  3: 21.51  4: 21.90  5: 21.00  6: 21.69  7: 20.39
maxSegEn:
0: 20.72  1: 24.91  2: 24.84  3: 25.00  4: 24.72  5: 24.55  6: 25.00  7: 24.11
minSegEn:
0: 12.60  1: 18.41  2: 12.63  3: 12.67  4: 12.82  5: 16.25  6: 14.80  7: 14.45 c (component's weight):
0> 0: 0.69  1: 0.20  2: 0.10
1> 0: 0.40  1: 0.27  2: 0.30
2> 0: 0.26  1: 0.28  2: 0.45
3> 0: 0.39  1: 0.58  2: 0.02
4> 0: 0.04  1: 0.22  2: 0.73
5> 0: 0.53  1: 0.36  2: 0.10
6> 0: 0.47  1: 0.43  2: 0.09
7> 0: 0.58  1: 0.34  2: 0.07

FIG._5S me (means vector):
0> 0: 11.00, 1: 17.28, 2: 20.72, 3: 12.60, 4: 0.00, 5: 0.00, 6: 0.00, 7: 0.00, 8: -0.00, 9: 1.74, 10: -0.07, 11: 0.00, 12: 0.00, 13: 0.00, 14: 0.00, 15: 0.00, 16: -0.00, 17: 0.01, 18: 0.00, 19: 0.00, 20: 0.00, 21: 0.00, 22: 0.00, 23: 0.00,
1> 0: 6.00, 1: 21.75, 2: 24.91, 3: 18.41, 4: -0.02, 5: -0.00, 6: 0.00, 7: 0.00, 8: -0.00, 9: 0.00, 10: -0.07, 11: 0.00, 12: 0.00, 13: 0.00, 14: 0.00, 15: 0.00, 16: -0.02, 17: -0.00, 18: 0.00, 19: -0.00, 20: 0.00, 21: -0.02, 22: 0.00, 23: 0.00,
2> 0: 8.00, 1: 20.74, 2: 24.84, 3: 12.63, 4: 0.00, 5: 0.00, 6: 0.00, 7: -0.16, 8: 0.00, 9: -0.00, 10: 0.00, 11: -0.00, 12: 0.00, 13: -0.00, 14: -0.00, 15: 0.00, 16: -0.00, 17: -0.00, 18: 0.00, 19: -0.00, 20: 0.00, 21: -0.01, 22: 0.00, 23: 0.00,
3> 0: 9.00, 1: 21.51, 2: 25.00, 3: 12.67, 4: -0.00, 5: 0.00, 6: 29.91, 7: 0.00, 8: -0.00, 9: 0.00, 10: 0.00, 11: 0.00, 12: 0.00, 13: -0.00, 14: 0.00, 15: 0.00, 16: 0.00, 17: 0.00, 18: 0.00, 19: -149.76, 20: 0.17, 21: 0.00, 22: 0.00, 23: 0.00,
4> 0: 7.00, 1: 21.90, 2: 24.72, 3: 12.82, 4: 0.00, 5: -0.00, 6: 0.00, 7: 0.00, 8: -0.00, 9: 0.00, 10: -0.00, 11: -0.00, 12: 0.00, 13: 0.00, 14: 0.00, 15: -0.00, 16: -0.00, 17: -0.00, 18: 0.00, 19: -0.00, 20: -0.00, 21: -0.00, 22: -0.00, 23: 0.00,
5> 0: 7.00, 1: 21.00, 2: 24.55, 3: 16.25, 4: 0.00, 5: 0.00, 6: 0.00, 7: -0.00, 8: 0.00, 9: 0.00, 10: 0.00, 11: 0.00, 12: 0.01, 13: -0.01, 14: 0.00, 15: 0.00, 16: -0.00, 17: -0.00, 18: 0.00, 19: 0.00, 20: -0.03, 21: 0.00, 22: 0.00, 23: 0.00,
6> 0: 9.00, 1: 21.69, 2: 25.00, 3: 14.80, 4: -0.00, 5: 0.00, 6: 0.00, 7: 0.00, 8: 0.00, 9: 0.00, 10: 0.00, 11: 0.00, 12: 0.00, 13: -0.00, 14: -0.00, 15: -0.13, 16: 0.00, 17: 0.00, 18: -0.00, 19: -0.00, 20: -0.00, 21: 0.00, 22: 0.00, 23: 0.00,
7> 0: 11.00, 1: 20.39, 2: 24.11, 3: 14.45, 4: 0.00, 5: 0.00, 6: 0.00, 7: 0.00, 8: 0.00, 9: 0.00, 10: 0.00, 11: 0.00, 12: 0.00, 13: 0.00, 14: 0.00, 15: 0.00, 16: 0.00, 17: 0.00, 18: 0.00, 19: 0.00, 20: 0.00, 21: 0.00, 22: 0.00, 23: 0.00,

FIG._5T state transition matrix:
```
0.9260, 0.0740, 0.0000, 0.0000, 0.0000, 0.0000, 0.0000, 0.0000,
0.0000, 0.8975, 0.1025, 0.0000, 0.0000, 0.0000, 0.0000, 0.0000,
0.0000, 0.0000, 0.9059, 0.0941, 0.0000, 0.0000, 0.0000, 0.0000,
0.0000, 0.0000, 0.0000, 0.9216, 0.0784, 0.0000, 0.0000, 0.0000,
0.0000, 0.0000, 0.0000, 0.0000, 0.9131, 0.0869, 0.0000, 0.0000,
0.0000, 0.0000, 0.0000, 0.0000, 0.0000, 0.9224, 0.0776, 0.0000,
0.0000, 0.0000, 0.0000, 0.0000, 0.0000, 0.0000, 0.9265, 0.0735,
0.0000, 0.0000, 0.0000, 0.0000, 0.0000, 0.0000, 0.0000, 0.9560,
```

FIG._5U

Name 7 (black)
actual number of states 8 meanSegLen:
0: 8.83 1: 6.05 2: 13.65 3: 13.09 4: 8.70 5: 10.99 6: 14.98 7: 25.62
maxSegLen:
0: 13.00 1: 15.00 2: 16.00 3: 16.00 4: 15.00 5: 16.00 6: 16.00 7: 53.00
minSegLen:
0: 5.00 1: 6.00 2: 6.00 3: 6.00 4: 6.00 5: 6.00 6: 6.00 7: 2.00
meanSegEn:
0: 19.58 1: 20.82 2: 21.86 3: 20.49 4: 20.22 5: 20.95 6: 20.53 7: 19.83
maxSegEn:
0: 22.19 1: 23.77 2: 25.00 3: 23.90 4: 23.08 5: 25.00 6: 24.47 7: 24.63
minSegEn:
0: 16.76 1: 18.22 2: 17.73 3: 17.47 4: 17.48 5: 18.28 6: 17.87 7: 16.83 c (component's weight):
0> 0: 0.18 1: 0.47 2: 0.34
1> 0: 0.23 1: 0.29 2: 0.47
2> 0: 0.50 1: 0.36 2: 0.13
3> 0: 0.41 1: 0.22 2: 0.36
4> 0: 0.52 1: 0.03 2: 0.42
5> 0: 0.42 1: 0.26 2: 0.31
6> 0: 0.53 1: 0.23 2: 0.22
7> 0: 0.57 1: 0.31 2: 0.10

FIG._5V

```
me (means vector):
0> 0:  5.00, 1: 19.58, 2: 22.19, 3: 16.76, 4:  0.00, 5:  0.00, 6:  0.00, 7:  0.00, 8: -0.00, 9:  0.00, 10: -
 0.00, 11:  0.00, 12:  0.00, 13:  0.00, 14:  0.00, 15: -0.00, 16:  0.00, 17: -0.00, 18:  0.00, 19: -0.00, 20:
 -0.00, 21:  0.00, 22: -0.00, 23:  0.00,
1> 0:  6.00, 1: 20.82, 2: 23.77, 3: 18.22, 4:  0.00, 5:  0.00, 6:-402.41, 7:  0.00, 8:  0.00, 9:  0.00, 10:
 0.00, 11:  0.00, 12:  0.00, 13:  0.00, 14:  0.00, 15: -0.00, 16:  0.00, 17: -0.00, 18:  0.00, 19:  0.00, 20:
 0.95, 21: -0.00, 22:112.62, 23:  0.00,
2> 0:  6.00, 1: 21.86, 2: 25.00, 3: 17.73, 4:  0.00, 5:  0.00, 6:  0.00, 7:  0.00, 8:  0.00, 9: -0.00, 10:
 0.00, 11:  0.00, 12:  0.00, 13:  0.00, 14: -0.00, 15: -0.00, 16:  0.00, 17:  0.00, 18: -0.00, 19: -0.00, 20:
 -0.00, 21:  0.00, 22: -0.00, 23:  0.00,
3> 0:  6.00, 1: 20.49, 2: 23.90, 3: 17.47, 4: -0.00, 5: -0.00, 6:  0.00, 7:  0.00, 8: -0.00, 9:  0.00, 10: -
 0.02, 11:  0.00, 12:  0.00, 13: -0.00, 14:  0.00, 15:  0.00, 16:  0.00, 17:  0.00, 18:  0.00, 19: -0.00, 20:
 0.00, 21:  0.00, 22: -0.00, 23:  0.00,
4> 0:  6.00, 1: 20.22, 2: 23.08, 3: 17.48, 4:  0.00, 5:  0.00, 6:  0.00, 7:  0.00, 8: -0.00, 9:  0.00, 10:
 1.21, 11: -0.00, 12: -0.00, 13:  0.00, 14:  0.00, 15:149.25, 16:  0.00, 17:  0.00, 18:  0.00, 19:  0.00, 20:
 0.00, 21:  0.00, 22: -0.00, 23: -0.00,
5> 0:  6.00, 1: 20.95, 2: 25.00, 3: 18.28, 4: -0.00, 5:  0.00, 6: -0.00, 7: -0.00, 8:  0.00, 9:  0.00, 10: -
 0.00, 11:  0.00, 12:  0.00, 13:  0.00, 14:  0.00, 15:  0.91, 16:  0.00, 17: -0.01, 18:  0.00, 19:  0.00, 20:
 0.00, 21:  0.00, 22:  0.00, 23:  0.00,
6> 0:  6.00, 1: 20.53, 2: 24.47, 3: 17.87, 4: -0.00, 5:  0.00, 6:  0.00, 7:  0.00, 8: -0.00, 9:  0.00, 10:
 0.00, 11:  0.00, 12:  0.00, 13:  0.00, 14:  0.00, 15:  0.00, 16:-124.37, 17:  1.77, 18: -0.00, 19:  0.00,
 20:  0.00, 21:  0.00, 22:  0.00, 23: -0.00,
7> 0:  2.00, 1: 19.83, 2: 24.63, 3: 16.83, 4:  0.00, 5:  0.00, 6:  0.00, 7:  0.00, 8:  0.00, 9:  0.00, 10:  0.00,
 11:  0.00, 12:  0.00, 13:  0.00, 14:  0.00, 15:  0.00, 16:  0.00, 17:  0.00, 18:  0.00, 19:  0.00, 20:  0.00,
 21:  0.00, 22:  0.00, 23:  0.00,
```

FIG._5W state transition matrix:

| 0.8847, | 0.1153, | 0.0000, | 0.0000, | 0.0000, | 0.0000, | 0.0000, | 0.0000, |
|---|---|---|---|---|---|---|---|
| 0.0000, | 0.8829, | 0.1171, | 0.0000, | 0.0000, | 0.0000, | 0.0000, | 0.0000, |
| 0.0000, | 0.0000, | 0.8922, | 0.1078, | 0.0000, | 0.0000, | 0.0000, | 0.0000, |
| 0.0000, | 0.0000, | 0.0000, | 0.9113, | 0.0887, | 0.0000, | 0.0000, | 0.0000, |
| 0.0000, | 0.0000, | 0.0000, | 0.0000, | 0.9036, | 0.0964, | 0.0000, | 0.0000, |
| 0.0000, | 0.0000, | 0.0000, | 0.0000, | 0.0000, | 0.9069, | 0.0931, | 0.0000, |
| 0.0000, | 0.0000, | 0.0000, | 0.0000, | 0.0000, | 0.0000, | 0.9131, | 0.0869, |
| 0.0000, | 0.0000, | 0.0000, | 0.0000, | 0.0000, | 0.0000, | 0.0000, | 0.9665, |

*FIG._5X*

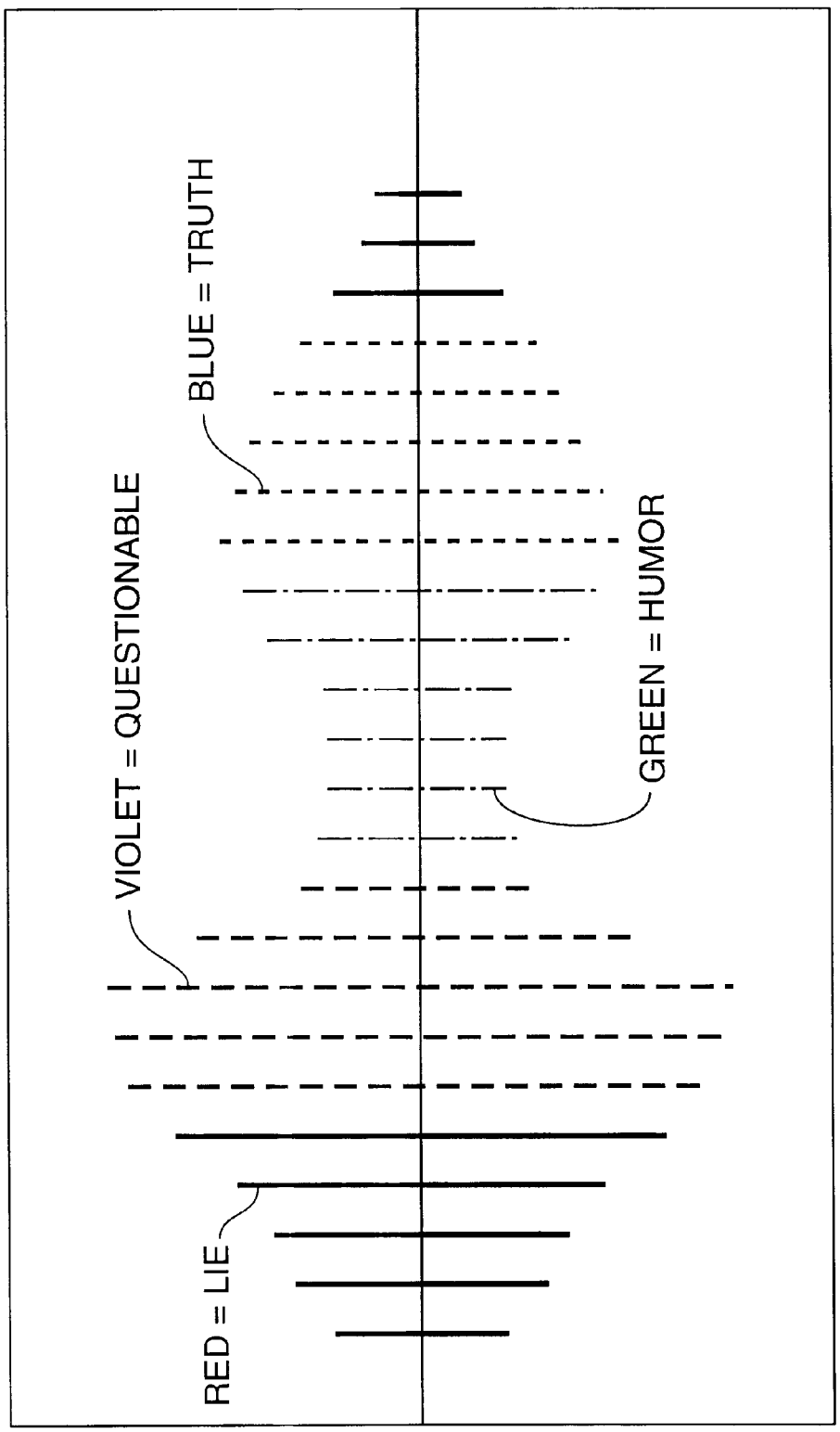
FIG._6

|    | 1  | 2  | 3  | 4  | 5  | 6  | 7  | 8  | 9  | 10 | 11 | 12 | 13 | 14 | 15 | 16 |
|----|----|----|----|----|----|----|----|----|----|----|----|----|----|----|----|----|
| 1  | Id | S  | A  | R  | T  | I  | bl | m  | su | co | qe | D  | r  | i  | rl | hs |
| 2  | S  | Id | R  | A  | I  | T  | m  | bl | co | su | D  | qe | i  | r  | hs | rl |
| 3  | A  | R  | Id | S  | rl | hs | r  | i  | qe | D  | su | co | bl | m  | T  | I  |
| 4  | R  | A  | S  | Id | hs | rl | i  | r  | D  | qe | co | su | m  | bl | I  | T  |
| 5  | T  | I  | rl | hs | Id | S  | A  | R  | r  | i  | bl | m  | su | co | qe | D  |
| 6  | I  | T  | hs | rl | S  | Id | R  | A  | i  | r  | m  | bl | co | su | D  | qe |
| 7  | bl | m  | r  | i  | A  | R  | Id | S  | rl | hs | T  | I  | qe | D  | su | co |
| 8  | m  | bl | i  | r  | R  | A  | S  | Id | hs | rl | I  | T  | D  | qe | co | su |
| 9  | su | co | qe | D  | r  | i  | rl | hs | Id | S  | A  | R  | T  | I  | bl | m  |
| 10 | co | su | D  | qe | i  | r  | hs | rl | S  | Id | R  | A  | I  | T  | m  | bl |
| 11 | qe | D  | su | co | bl | m  | T  | I  | A  | R  | Id | S  | rl | hs | r  | i  |
| 12 | D  | qe | co | su | m  | bl | I  | T  | R  | A  | S  | Id | hs | rl | i  | r  |
| 13 | r  | i  | bl | m  | su | co | qe | D  | T  | I  | rl | hs | Id | S  | A  | R  |
| 14 | i  | r  | m  | bl | co | su | D  | qe | I  | T  | hs | rl | S  | Id | R  | A  |
| 15 | rl | hs | T  | I  | qe | D  | su | co | bl | m  | r  | i  | A  | R  | Id | S  |
| 16 | hs | rl | I  | T  | D  | qe | co | su | m  | bl | i  | r  | R  | A  | S  | Id |

Id – IDENTICAL   T – TRANSMITTER   su – SUPER-EGO   bl – BUSINESS-LIKE   S – SUPPLEMENTAL   r – RECEIVER
co – COMPLETE OPPOSITION   m – MIRAGICAL   A – ACTIVATION   I – INSPECTOR   qe – QUASI-EQUAL
hs – HALF-SUPPLEMENTED   R – REFLECTABLE   i – INSPECTED   D – DISPUTE 12   rl – RELATED

FIG._7

SPEECH SIGNAL PROCESSING FOR DETERMINING PSYCHOLOGICAL OR PHYSIOLOGICAL CHARACTERISTICS USING A KNOWLEDGE BASE

BACKGROUND

1. Field of the Invention

The present invention relates to the field of speech analysis, and in particular to the analysis of an individual's speech to determine psychological, physiological or other characteristics.

2. Description of the Related Art

Scientists have long known that qualities of the human voice may indicate the emotions of the speaker. Speech is the acoustic response to motion of the vocal cords and the vocal tract, and to the resonances of openings and cavities of the human head. Air pressure from the lungs is modulated by muscular tension of the vocal cords, among other influences. Human emotions, as well as certain physiological conditions not typically associated with the voice, affect this muscular tension, and thereby affect voice modulation. Further, speech may also be affected by certain physiological conditions, such as dementia, learning disabilities, and various organically-based speech and language disorders.

Others have attempted to associate emotional qualities quantitatively with physical speech characteristics. In U.S. Pat. No. 3,855,417, issued to Fuller, the normalized peak energy ratio from two frequency bands of a subject's voice is used to determine whether the subject is telling the truth. In U.S. Pat. No. 3,855,416, issued to Fuller, a skilled interrogator asks the subject questions designed to elicit a true or false response. Fuller's system weighs a measure of the vibrato content of the subject's speech with the peak amplitude from a selected frequency band. The interrogator derives the veracity of the subject's statement through a comparison of the resulting quantity with a known truthful response.

In U.S. Pat. No. 4,093,821, issued to Williamson, a speech analyzer operates on the frequency components within the first formant band of a subject's speech. The analyzer examines occurrence patterns in differential first formant pitch, rate of change of pitch, duration, and time distribution. The analyzer produces three outputs. The first output indicates the frequency of nulls or "flat" spots in a FM-demodulated first-formant speech signal. Williamson discloses that small differences in frequency between short adjacent nulls indicate stress, and that large differences in frequency between adjacent nulls indicate relaxation. The second output indicates the duration of the nulls. According to Williamson, the longer the nulls, the higher the stress level. The third output is proportional to (1) the ratio of the total duration of nulls during a word period to (2) the total length of the word period. According to Williamson, an operator can determine the emotional state of an individual based upon these three outputs.

U.S. Pat. No. 5,148,483, issued to Silverman, describes a method for detecting suicidal predisposition based upon speech. The voice analyzer examines the signal amplitude decay at the conclusion of an utterance by a test subject, and the degree of amplitude modulation of the utterance. The subject's speech is filtered and displayed on a time-domain strip chart recording. A strip chart recording of a similarly filtered speech signal from a mentally healthy person is obtained. A skilled operator compares the parameters of interest from these two strip charts to determine whether the test subject is predisposed to suicide.

U.S. Pat. No. 4,490,840, issued to Jones, is based upon a relationship between so-called "perceptual dimensions" and seven "vocal profile dimensions." The seven vocal dimensions include two voice and five speech dimensions, namely: resonance, quality, variability-monotone, choppy-smooth, staccato-sustain, attack-soft, and affectivity-control. The voice, speech and perceptual dimensions require assembly from 14 specific properties representative of the voice signal in the frequency domain, plus four arithmetic relationships among those properties, plus the average differences between several hundred consecutive samples in the time domain. To arrive at voice style "quality" elements, the system relies upon relationships between the lower set and the upper set of frequencies in the vocal utterance. The speech style elements, on the other hand, are determined by a combination of measurements relating to the pattern of vocal energy occurrences such as pauses and decay rates. The voice style "quality" elements emerge from three spectral analysis functions, whereas the speech style elements result from four other analysis functions. The voice style quality analysis elements include spectrum spread, spectrum energy balance, and spectrum envelope flatness. The speech style elements are spectrum variability, utterance pause ratio analysis, syllable change approximation, and high frequency analysis.

Jones relates the seven vocal dimensions and seven perceptual style dimensions only to the above-described sound style elements. Each dimension is described as a function of these selected sound style elements. According to Jones's theory, the seven perceptual style dimensions or even different perceptual, personality or cognitive dimensions can be described as a function of the seven sound style elements.

The limitation in the Jones system to seven speech elements apparently constrains the psychological characteristics that can be measured by the system. Jones states that "[t]he presence of specific emotional content such as fear, stress, or anxiety, or the probability of lying on specific words, is not of interest to the invention disclosed herein." Col. 5, lines 42–45.

Each prior art voice analyzer generally relies upon one or more highly specific frequency or time characteristics, or a combination thereof, in order to derive the emotional state of the speaker. None of the references provides flexibility in the frequency or time domain qualities that are analyzed. Jones allows a variation in the weighting of the seven sound style elements, but does not permit variation of the elements themselves. Further, all the known prior art characterizations of speech rely upon a priori knowledge of speech patterns, such as knowledge of vibrato content, properties of speech within the first formant, amplitude decay properties, staccato-sustain and attack-soft. The prior art does not contemplate allowing a flexible variation of the disclosed specific time and frequency qualities even though such a variation may enable a speech-based assessment to correlate strongly with traditional psychological assessments, such as the Myers Briggs test and MMPI. Such flexibility is highly desirable given that the psychological profile of an individual is already difficult to quantify. Further, it is desirable to provide a speech analysis system that can also be easily adapted to assessing physiological traits of an individual.

SUMMARY OF THE INVENTION

The present invention provides a speech-based system for assessing psychological, physiological or other characteristics of a test subject. The system includes a knowledge base that stores one or more speech models, where each speech model corresponds to a characteristic of a group of reference subjects. Signal processing circuitry, which may be implemented in hardware, software and/or firmware, compares the test speech parameters of a test subject with the speech models. In one embodiment, each speech model is represented by a statistical time-ordered series of frequency representations of the speech of the reference subjects. The speech model is independent of a priori knowledge of style parameters associated with the voice or speech. The system includes speech parameterization circuitry for generating the test parameters in response to the test subject's speech. The speech parameterization circuitry includes speech acquisition circuitry, which may be located remotely from the knowledge base. The system further includes output circuitry for outputting at least one indicator of a characteristic in response to the comparison performed by the signal processing circuitry. The characteristic may be time-varying, in which case the output circuitry outputs the characteristic in a time-varying manner. The output circuitry also may output a ranking of each output characteristic. In one embodiment, one or more characteristics may indicate the degree of sincerity of the test subject, where the degree of sincerity may vary with time. The system may also be employed to determine the effectiveness of treatment for a psychological or physiological disorder by comparing psychological or physiological characteristics, respectively, before and after treatment.

BRIEF DESCRIPTION OF THE DRAWINGS

FIG. 1 is a simple block diagram illustrating the speech-based assessment system of the present invention.

FIG. 2 is a functional block diagram illustrating the functions performed by the structure of FIG. 1.

FIG. 3 is a block diagram illustrating one embodiment of a speech parameterization process employed by the present invention.

FIG. 4 is a simplified two-dimensional representation of an embodiment of the knowledge base employed by the present invention.

FIGS. 5a–5x illustrate a knowledge base for the Lüscher color test.

FIG. 6 illustrates an inventive sonogram display illustrating time-dependent psychological or physiological characteristics of the speaker.

FIG. 7 illustrates the SOCION matrix employed by one embodiment of the present invention.

DETAILED DESCRIPTION OF THE INVENTION

The present invention provides a method and apparatus for speech-based psychological or physiological assessment. In the following description, numerous details are set forth in order to enable a thorough understanding of the present invention. However, it will be understood by those of ordinary skill in the art that these specific details are not required in order to practice the invention. Further, well-known elements, devices, process steps and the like are not set forth in detail in order to avoid obscuring the present invention.

FIG. 1 is a simple block diagram illustrating the present invention. The system includes a microphone input 100 to speech acquisition circuitry 102, such as a SOUND BLASTER sound card manufactured by Creative Labs. The sound card outputs speech data to a CPU 104, which stores speech information in memory 106. A display 108 is coupled to the CPU to display psychological or physiological characteristics determined in response to the speech of a test subject speaking into the microphone.

FIG. 2 is a functional block diagram illustrating the functions performed by the structure of FIG. 1. A knowledge base 200 stored in memory 106 stores speech parameters that are associated with particular psychological or physiological characteristics. The speech of a test subject is correlated with the speech parameters in the knowledge base 200 by first parameterizing the test subject's speech 202, and then determining the degree of similarity 204 between the test subject's speech parameters and the speech parameters in the knowledge base 200. The psychological or physiological characteristics associated with the speech parameters in the knowledge base that correlate most highly with the test subject's speech parameters are displayed on the display 108. The speech parameterization takes place in the speech acquisition circuitry 102, which digitizes the speech, and in the CPU 104, which converts the digitized speech samples into speech parameters, as described below. The comparison 204 is carried out by the CPU 104. Of course, those skilled in the art will recognize that the circuitry of the present invention may be implemented in hardware, software, firmware and/or other programmed logic.

Knowledge Base

The knowledge base contains speech parameters that are correlated with psychological or physiological characteristics. The knowledge base is created by forming statistically large groups of people, where each group exhibits the same psychological or physiological characteristic. A larger superset of people is divided into these psychologically or physiologically homogeneous groups by conducting a psychological or physiological assessment, respectively, of the superset. As will become apparent from the description below, the present invention may be adapted to use any psychological or physiological test. For convenience, much of the description below concerns psychological characteristics, although those skilled in the art will recognize that the invention may easily be adapted to measure physiological characteristics.

Regardless of the test employed, formation of the knowledge base requires two basic steps. First, psychologically homogeneous groups are formed based upon a psychological assessment, described below. Second, the speech parameters most closely associated with each group are determined. To perform this step, each subject ("reference subject") in each group speaks into the microphone. Each subject's speech is then parameterized. The process for parameterizing both the reference subjects' speech to create the knowledge base, and the test subject's speech for the later pattern comparison are illustrated in FIG. 3. The speech parameters for all the subjects in a group are collected. The collected parameters are divided into clusters. The statistics of the resulting clusters represent the corresponding psychologically homogeneous groups. These cluster statistics are later compared to the speech parameters of a test subject in order to determine the likelihood that the subject falls within each psychologically homogeneous group. The formation of the knowledge base using the cluster statistics is performed off-line for use in such subsequent testing.

To digitize the speech, the sound card 102 samples the sound at a rate of 16,000 16-bit samples per second or at 32 KB/s. Each subject speaks into the microphone 100 for at least two to three minutes. The subject is instructed to speak continuously in a normal tone of voice at a normal speaking volume without singing, counting or yelling. Although not necessary, each reference subject may be instructed to speak the same words. The digitized speech samples from each reference subject are stored in memory, e.g., hard disk.

The CPU 104 reads this data to generate 30 phrases as follows. The CPU 104 detects pauses in the speech using standard techniques. For example, a pause may be indicated when the amplitude of a speech sample drops below five times the amplitude of the background noise. The CPU 104 then determines whether 6,720 samples after the pause occur before the next pause. If so, those samples are denoted a phrase. Thirty such phrases, each beginning after a pause, are categorized as such by the CPU 104. The CPU 104 divides each phrase into eight states of 840 samples each (300).

Using well known speech processing techniques, each state is parameterized. For example, the present invention may employ the linear predictive coding (LPC) techniques described in Chapter 3 of L. Rabiner, B. Juang, *Fundamentals of Speech Recognition*, Prentice Hall, 1993 ("Rabiner"). The entire text of the Rabiner book is incorporated by reference herein. See especially Section 3.37 and FIG. 3.3.7.

FIG. 3 illustrates the LPC processing steps implemented by the CPU 104. Each state, s(i), is put through a low-order digital system 302 (typically a first-order FIR filter) to spectrally flatten the signal and make it less susceptible to finite precision effects later in the signal processing. This preemphasis is either fixed or slowly adaptive (e.g., to average transmission conditions, noise background, etc.). Rabiner uses the preemphasis filter $$H(z) = 1 - az^{-1}, \text{ where } 0.9 \leq a \leq 1.0.$$

As a result, the output of the preemphasis filter, s'(i), is related to the input to the filter s(i) by the difference equation $$s'(i) = s(i) - a\, s(i-1).$$

A common value for a=0.95.

The preemphasized signal s(i) is then blocked into frames, $x_l(n)$, where n=0, 1, ..., N−1, l=0, 1, ..., L−1 (304). Each frame consists of N speech samples, and each state comprises L frames. The frames are separated by M samples.

The next step requires that each frame be windowed to minimize the high frequency components caused by the discontinuities at the beginning and end of each frame (306). In one embodiment, each state is 840 samples long, comprising L=5 frames of N=360 samples that overlap by 240 samples so their adjacent frames are separated by M=120 samples.

The result of windowing is the signal $$\tilde{x}_l(n) = x_l(n) w(n) \quad 0 \leq n \leq N-1$$

where typically the Hamming window $$w(n) = 0.54 - 0.46 \cos(2\pi n/(N-1)) \quad 0 \leq n \leq N-1$$

is used.

This window is first applied to samples 0 through 359 of the state, then 120 through 479, then 240 through 599 and so on until five windowed frames for each state are generated. As will be seen below, the center windowed frame (l=2) will be used in computing the cepstral coefficients, whereas the other windowed frames will be employed in calculating the temporal cepstral derivative coefficients, i.e., the delta cepstral vector.

The present invention characterizes the speech states using cepstral coefficients, which are derived from the standard LPC coefficients. The cepstral coefficients provide a useful and compact characterization of speech. As an intermediate step, each center frame of the windowed signal is autocorrelated to give $$r_l(m) = \sum_{n=0}^{N-1-m} \tilde{x}_l(n) \tilde{x}_l(n+m)$$

where l=2 and m=0, 1, ..., p, and p is the highest order of the autocorrelation analysis (308). Typically, p ranges from 8 to 16. As an example, the inventors have used p=11. The zeroth autocorrelation, $r_l(0)$, is the energy of the lth frame.

The autocorrelation is employed to compute the linear prediction coefficients $a_m$ of the following recursion equation, which provides a good approximation of the vocal tract $$\tilde{x}_l(n) \cong \sum_{m=1}^{p} a_m \tilde{x}_l(n-m), \quad p = 11$$

The LPC coefficients are determined by converting the autocorrelation coefficients using a technique known as Durbin's method, which is basically the same as the Cholesky decomposition (310). Durbin's method may be implemented by the following algorithm (for convenience, the subscript l on $r_l(m)$ is omitted).

Initialize $$E^{(0)} = r(0)$$

$$k_0 = -r(1)/r(0)$$

$$\alpha_1^{(1)} = k_0$$

$$E^{(1)} = (1 - k_0^2) E^{(0)}$$

Then recursively compute $$k_m = -\left\{ r(m+1) + \sum_{i=1}^{m} a_i^{(m)} r(|m+1-i|) \right\} / E^{(m)}$$

$$\alpha_i^{(m+1)} = \alpha_i^{(m)} + k_m \alpha_{m+1-i}^{(m)}$$

$$\alpha_{m+1}^{(m+1)} = k_m$$

$$E^{(m+1)} = E^{(m)}(1 - k_m^2)$$

for $1 \leq i \leq m$, $1 \leq m \leq p-1$. The results of these calculations are the linear prediction coefficients $\alpha_m = \alpha_m^{(p)}$ for $1 \leq m \leq p$, where the parenthetical superscript refers to the iteration number. The cepstral coefficients, $c_m$, are computed from the LPC coefficients as follows (312). The cepstral coefficients characterize the cepstrum.

$$c_m = a_m + \sum_{k=1}^{m-1} \left( \frac{k}{m} \right) c_k a_{m-k} \quad 1 \leq m \leq p$$

The zeroth cepstral coefficient is the energy of the center frame (representing the energy of the state) and is given by $10 \log_{10} r(0)$.

As described in Rabiner, the cepstral coefficients are then weighted to minimize the sensitivity of the low-order cepstral coefficients to overall spectral slope and the sensitivity of the high-order cepstral coefficients to noise, as follows (314).

$$\hat{c}_0 = k_0$$

$$\hat{c}_m = w_m c_m \quad 1 \leq m \leq p$$

where $$w_m = 1 + 0.5p \, \sin(\pi m/p) \quad 0 < m < p+1$$
$$= 0 \quad\quad\quad\quad\quad\quad\quad p < m$$

To improve the representation of the speech spectrum, the analysis is extended to include information about the temporal cepstral derivative, which introduces temporal order into the representation (316). The so-called delta cepstral coefficients are an approximation to the time derivatives of the cepstral coefficients. They are given by the equation $$\Delta c_m(l) = \frac{3}{8} \sum_{k=-K}^{K} k \, \hat{c}_m(l+k)$$

where K=2 and l=2, the time index (frame number) that denotes the central windowed frame in a state. The zeroth through eleventh coefficients of the complete cepstral vector c comprise the central frame (l=2) $\hat{c}_m$ coefficients for $0 \leq m \leq p$, where p=11.

The 12th through 23rd coefficients of c are $c_{12+m}=\Delta c_m(2)$ for $0 \leq m \leq 11$. As a result, there is one c vector (denoted the "cepstral vector" for convenience) for each state. The vector may be expressed as $$c=(\hat{c}_0,\hat{c}_1,\hat{c}_2,\ldots,\hat{c}_{11},\Delta c_0,\Delta c_1,\ldots,\Delta c_{11})$$

Where the arguments for the $\Delta c$ terms have been omitted because it is assumed that l=2.

The final step in the computation of the cepstral vectors is energy normalization (318). The zeroth component is replaced by the definition $$\hat{c}_0=\{c[0]-EN_{max}+75\}/3$$

where $\hat{c}_0$ is the normalized energy of the state.

$$c[0]=[\max 10 \, \log_{10} r(0), 0]$$

$EN_{max}=\max\{c[0]\}$ for all states within a phrase.
As a result, for p=11, a 24-coefficient vector $$c=(\hat{c}_0,\hat{c}_1,\hat{c}_2,\ldots,\hat{c}_{11},\Delta c_0,\Delta c_1,\ldots,\Delta c_{11})$$

characterizes each state. A total of 240 such cepstral vectors characterize the eight states in 30 phrases for each reference subject.

To complete the characterization of all the reference subjects in a psychologically homogeneous group, the CPU sorts the vectors representing each state into a set of three clusters 400 for each state, as shown in a simplified two-dimensional representation in FIG. 4. Clusterization can be performed using the K-means algorithm described in Rabiner, e.g., § 3.4.4. Note that each reference subject is characterized by 30 vectors per state, one from each of the 30 phrases uttered by each reference subject. Accordingly, 30×R vectors are sorted into clusters for each state, where R is the number of reference subjects in a psychologically homogeneous group.

In one embodiment, the present invention may employ the K-means algorithm described in Rabiner or a variation thereof. According to this variation, the algorithm first computes a matrix of distances between each cepstral vector and all other cepstral vectors representing a particular state. The distance is the usual Euclidean distance in 24 dimensions, except that the square of the difference of the zeroth component (related to energy of the state) is weighted by multiplying it by 3 instead of unity as for the other components. The distance matrix is used to compute the maximum distance between vectors, DMAX, and the mean distance between vectors, DMEAN. A quantity MAXDIST is calculated as min (1.4 DMEAN, 0.8 DMAX).

Next, the algorithm sorts into one cluster those vectors which are a distance of at least MAXDIST from all other vectors. The remaining vectors form a second cluster, the centroid of which is determined. Next, the larger cluster, i.e., the one having the maximum average intra-cluster distance, or variance in 24 dimensions, is determined. This may be the first cluster formed in the first step. The larger cluster is then divided into two clusters. This is accomplished by finding the two vectors in it that are farthest from each other, and choosing them as cluster centers. All the vectors that are not one of the three cluster centers are then assigned to the nearest neighbor cluster center, i.e., the cluster center to which an individual vector is closest. This process results in three clusters 400 per state.

The three cluster centroids are then recalculated. The distances of all the vectors in all three clusters are computed from each newly-calculated center. The vectors are then redistributed among the clusters so that each vector is closest to its nearest-neighbor cluster center. The centroids for these newly formed clusters are then calculated, and the redistribution process is continued until no vector is reassigned from one cluster to another. The result is three clusters 400 for each of the eight states within a psychologically homogeneous group (speech model 402) stored in the knowledge base. These clusters form the knowledge base. Cluster statistics are collected for use in the comparison with the speech parameters of a test subject. The following statistics are collected for each state within a psychologically homogeneous group:

cluster centers (3)
dispersion (3)
meansegen
maxsegen
minsegen
meanseglen
maxseglen
minseglen
cluster component weights (3)
mean vector
transition matrix The cluster centers are the centroids of the three clusters representing the psychologically homogeneous group. The dispersion is the mean square dispersion about each center in each of the 24 dimensions. In addition, the mean, minimum and maximum energies (meansegen, minsegen, maxsegen) for each state represent the mean, minimum and maximum energy statistics, respectively, of each state over all 30 phrases for all reference subjects. The energy of each individual state is derived from the zeroth component of its corresponding cepstral vector. The weight of a cluster represents the fraction of vectors within that cluster. The mean vector is the average of all cepstral vectors for a given state within a homogeneous group.

The invention later compares the cluster statistics in the knowledge base with the speech parameters of a test subject (204). Those skilled in the art will recognize that a wide variety of speech pattern comparison techniques may be employed for this purpose. A number of these techniques are described in Rabiner. In one embodiment, the present invention uses a hidden Markov model to characterize speech, as discussed in Rabiner, Chapter 6 (already incorporated by reference herein), and C. H. Lee, L. R. Rabiner, "Frame-Synchronous Network Search Algorithm for Connected Word Recognition," IEEE Transactions on Acoustics, Speech, and Signal Processing Vol. 37, No. 11, November 1989 ("Lee"), which is also incorporated by reference herein. Under that model, the invention first optimizes the knowledge base using the Viterbi algorithm. Then, during pattern comparison the invention again employs the Viterbi algorithm to determine the similarity of the test subject's speech parameters to those in the knowledge base. The calculations of the Viterbi similarity values are very well known in the art and widely described in the literature. In one embodiment, the present invention employs the modified Viterbi algorithm described in Lee.

The transition matrix is used in the pattern comparison process as part of the Viterbi algorithm. The transition matrix is stored in the knowledge base and later modified by the Viterbi algorithm. To create the initial transition matrix, an initial state duration (seglen) for each of the eight states is computed according to the following pseudo code.

Compute the mean energy ($E_{mean}$) over all the states, i.e., add the meansegen for all 8 states within a group in the knowledge base and divide by 8.

1. ACC=0 (energy accumulator=0)
2. $old_i$=0
3. i=0
4. k=0
5. ACC=ACC+meansegen (i)
6. if (ACC$\geq E_{mean}$) then
7. ACC=0
8. seglen(k)=i-$old_i$-1
9. $old_i$=i-1
10. i=i-1
11. k=k+1
12. if (k>7) go to 19
13. endif
14. i=i+1
15. if (i>7) go to 18
16. continue
17. go to 5
18. if (k<8) seglen (k)=i-$old_i$
19. end This algorithm produces a set of values for the state durations seglen (k) for the states k=0,1, . . . ,7. Those skilled in the art will recognize that other well-known techniques may be substituted to optimize the state durations.

The next step in the construction of the knowledge base for later use in a Viterbi pattern comparison is the computation of an initial transition matrix. The transition matrix characterizes a first-order Markov process. The matrix comprises all zero elements except for the diagonal and super-diagonal elements. The diagonal elements are $A_{k,k}$=ln ($\alpha_{k,k}$), where $$a_{k,k} = \frac{1}{1 + \text{seglen}(k)},$$

and seglen(k) is the length of the kth state. The superdiagonal elements are given by $A_{k,k+1}$=ln ($\alpha_{k,k+1}$), where $\alpha_{k,k+1}$= 1-$\alpha_{k,k}$ for k=0,1, . . . ,7.

This initial transition matrix is optimized using the Viterbi algorithm. The Viterbi algorithm generates a similarity measure or distance that is proportional to the logarithm of the probability of similarity of a vector to the speech model (for a particular homogeneous group) stored in the knowledge base. The probability of being in the most likely one of the three clusters (i.e., the closest cluster) for each state is noted and the product of these probabilities for all eight states in a phrase is kept as the chance that that phrase fits the model for a particular homogeneous group. This process is repeated for all 30 phrases to arrive at a total probability that the 30-phrase utterance belongs to a particular homogeneous group in the knowledge base. The total probability for all 30 phrases is the product of the probabilities for each phrase.

The Viterbi algorithm is employed to optimize the knowledge base by comparing all 30 phrases for each reference subject with the homogenous group in the knowledge base to which the reference subject belongs (i.e., the speech model for that group). The Viterbi distance between each reference subject's cepstral vectors and the closest cluster within a three-cluster set is recorded for each state in the reference subject's homogeneous group in the knowledge base. The Viterbi distance for each phrase is then calculated, as described above. The Viterbi algorithm is then iterated to obtain the optimum state duration for the comparison of a phrase of the reference subject's speech to the speech model of the homogeneous group to which the reference subject belongs. The optimum state duration produced at every step is averaged over the phrases and the iterations with the variable mean seglen (initially seglen) to produce a new mean seglen value. The mean seglen value is substituted for seglen in the calculation of the diagonal and super-diagonal elements of the transition matrix. The iteration process is continued for approximately 3 to 7 iterations. The most likely model, i.e., the model resulting in the highest total probability for all 30 phrases is retained in case the quality deteriorates after more iterations. This process is described in the Lee paper, incorporated by reference herein. At the optimum state duration, the Viterbi distance between the 30 phrases and the model for that homogeneous group is minimized. The result is a transition matrix that is used later in the pattern comparison process.

Pattern Comparison

The speech parameters of a test subject are compared to the cluster statistics for each psychologically homogeneous group in order to determine which groups correlate most highly to the test subject. The test subject may be instructed to speak the same words as the reference subjects. Like the speech of a reference subject, the test subject's speech is digitized by a sound card. The CPU divides the test subject's speech into 30 phrases, and divides each phrase into eight states. The 30 phrases are parameterized into 240 cepstral vectors. Unlike the vectors generated for the reference subjects, the test subject's vectors are not clustered.

The thirty-phrase utterance for the test subject is compared to each homogeneous group in the knowledge base. This comparison is made phrase by phrase and for each state. The distance between the test subject's state cepstral vectors and the closest cluster within a three-cluster state set used as a state distance measure in the Viterbi algorithm. The Viterbi algorithm is iterated to adjust the state durations, in a similar manner as that described above, in order to minimize the Viterbi probability or distance between the test subject's vectors representing a phrase and a speech model for a homogeneous group (i.e., the eight three-cluster sets representing the group). The total probability of an utterance matching the model is calculated by multiplying the probabilities of all 30 phrases. The psychological characteristics associated with the speech models that register the highest of these optimized probabilities (either on phrase basis or, alternatively, the total probability of a 30-phrase utterance) are deemed to be the characteristics representing the psychological makeup of the test subject.

Those skilled in the art will recognize that a wide variety of speech characterization and comparison techniques can easily be employed to practice the present invention, and thus, the present invention is not limited to the exemplary techniques described herein.

Pattern Comparison with Myers-Briggs Knowledge Base

The above discussion generally describes how the speech of a test subject may be correlated with psychologically homogeneous groups in the knowledge base. In particular, the knowledge base may be broken down into groups corresponding to the 16 Jungian character types generated by the well-known Myers-Briggs Personality Assessment. For an explanation of this assessment and how it is administered, please refer to I. B. Myers, *Manual: A Guide to the Development and Use of the Myers-Briggs Type Indicator*, Consulting Psychological Press, Inc., Palo Alto, Calif., 1985, which is incorporated by reference herein. These 16 types, numbered for convenience, are as follows:

1. ENTP
2. ISFP
3. ESFJ
4. INTJ
5. ENFP
6. ISTP
7. ESTJ
8. INFJ
9. ESFP
10. INTP
11. ENTJ
12. ISFJ
13. ESTP
14. INFP
15. ENFJ
16. ISTJ

To form the knowledge base of Myers-Briggs types, the superset of reference subjects is assessed using the Myers-Briggs test. According to the test results, the superset is broken down into psychologically homogeneous groups of individuals corresponding to the 16 Jungian character types. Then, as described above, the speech parameters of these reference subjects are collected, clustered and Viterbi-optimized in order to provide a speech representation for each character type.

To perform the pattern comparison, 30 phrases of eight states each are collected from the test subject, as before. These 30 phrases are converted into 240 cepstral vectors. As before, the eight state cepstral vectors corresponding to the first phrase are compared using the Viterbi algorithm with the three-cluster sets representing each state for the first Jungian character type. The first phrase is similarly compared to the other 15 character types. This process is repeated for the 2nd through 30th phrases. The result is 30×16=480 Viterbi similarity values. This data is reduced by assigning to each phrase only the character type that resulted in the highest similarity value for the phrase. This results in 30 types corresponding to the 30 phrases. Invariably (because there are fewer types than phrases), some types will show up as corresponding to more than one phrase. Accordingly, the frequency of occurrence of each type is divided by 30 to yield the proportion of the total personality space for the test subject. Only types that account for more than 4% (i.e., occur more than once) are retained by the program. The CPU then causes to be displayed these character types along with the corresponding percentage of the test subject's personality space. In this manner, the assessment system of the invention recognizes that each individual may comprise a combination of personality types that are present in differing degrees.

In another embodiment, four scales can be created for the Myers-Briggs Jungian character types. In this scheme, there are four sets of opposite character constructs, E-I (extrovert-introvert), S-N (sensoric-intuitive), T-F (thoughtful-feeling), and J-P (decision maker-plagued). For the 30 types that correlate most highly to the 30 phrases, the number of phrases that exhibit the first construct in the corresponding type is subtracted from the number of phrases that exhibit the second construct. For example, for the first scale, the number of phrases that have E's in their corresponding type is subtracted from the number of phrases which have I's in their corresponding types. This difference is multiplied by a factor and a constant is added to create a range that runs from 0 to 100, or whatever range is most convenient for a raw score. For example, for 30 phrases the possible differences run from minus 30 to plus 30. Therefore, multiply by $5/3$ and add 50 to obtain a range from 0 to 100. This method may be extended to compute other scales related to different tests.

Pattern Comparison Using the Lüscher Color Knowledge Base A knowledge base may be formed using the well-known Lüscher Color test. The test is based upon the order of preference that the reference subjects have for the eight Lüscher colors: gray, blue, green, red, yellow, violet, brown or black. For an explanation of the Lüscher test and how it is administered, please refer to M. Lüscher (translated by I. Scott), *The Lüscher Color Test*, Washington Square Press 1969, which is incorporated by reference herein. The Lüscher test is administered to the superset of reference subjects, which is divided into eight homogeneous groups corresponding to the eight Lüscher Colors. The speech parameters of these groups are generated and stored in the knowledge base using the techniques described above. As an example, most of the knowledge base statistics for the Lüscher test are illustrated in FIGS. 5a–5x. Note that the transition matrix is not in logarithmic form, but in $a_{k,k}$ and $a_{k,k+1}$ form.

To perform the pattern comparison, each phrase of the test subject's speech is compared to each of the eight Lüscher groups in the knowledge base. For each phrase, the Viterbi similarity values corresponding to the eight colors are ranked in order from highest degree of comparison to smallest. These ranked colors are then sorted into five color couples according to the Lüscher technique. This procedure is repeated for the second through thirtieth phrases, so that there are five color couples for each phrase. Note that the first four couples are formed by pairing the colors in the order in which they occur. The fifth couple comprises the first color paired with the last. For example, if the Lüscher sequence in order of preference is blue, red, gray, yellow, green, violet, black, brown, then the Lüscher couples would be (+blue +red, ×gray ×yellow, =green =violet, −black −brown, +blue −brown).

The number of times a color couple appears in the first position is divided by 30 to yield the proportion that the color couple appears in the first position. This process is repeated for the second, third, fourth and fifth couple positions. Only color couples that appear in a particular position more than 4% of the time are retained by the program. For each color couple position, the system displays a descriptive paragraph concerning the psychological characteristics associated with the selected color couples, along with the percentage of occurrence that the couple appears in a particular position. One example of such descriptive paragraphs is found in the Lüscher book. These paragraphs may be modified, particularly by directing one set of descriptive paragraphs to lay people and another set to psychology professionals, without deviating from the basic meaning of the original Lüscher descriptive paragraphs.

Pattern Comparison Using Myers-Briggs Enhanced with Lüscher Knowledge Base

In another embodiment, the pattern comparison with the Myers-Briggs knowledge base is enhanced with information from the Lüscher knowledge base. In addition to the 16 Myers-Briggs homogeneous groups, this knowledge base also includes 8 subgroups corresponding to each Myers-Briggs group. The Lüscher color test is administered to each homogeneous group representing a Myers-Briggs personality type. Each group is divided into 8 subgroups, where each subgroup corresponds to the favorite color (of the eight) chosen by the reference subjects within the Myers-Briggs group. For example, the first Myers-Briggs type is ENTP. The reference subjects that primarily manifest this type form a homogeneous group whose speech parameters are stored in the knowledge base. This group is then administered the Lüscher test to determine the favorite colors of the members of the group. The group is then broken down into 8 subgroups based upon favorite color preference. These subgroups are: ENTP-gray, ENTP-blue, ENTP-green, ENTP-red, ENTP-yellow, ENTP-violet, ENTP-brown, and ENTP-black. Accordingly the knowledge base now comprises 16×8=128 subgroups in addition to the original 16 Myers-Briggs groups for a total of 144 speech models corresponding to homogeneous groups.

This enhanced knowledge base is used by first conducting a pattern comparison with the 16 Myers-Briggs speech models in the knowledge base, as before. This yields 30 highest-probability Jungian types for the 30 phrases in the test subject's utterance. Each phrase is then compared with the 8 speech model subgroups corresponding to the highest probability type for the phrase. This results in 8 Viterbi similarity values for each phrase. The 8 colors for the phrase are then ranked in order from highest degree of comparison to smallest. These ranked colors are then sorted into 5 color couples according to the Lüscher technique described above.

The number of times a color couple appears in the first position is divided by 30 to yield the proportion in percentage that a color couple appears in the first position. This process is repeated for the second, third, fourth and fifth couple positions. As before, only those color couples that appear in a particular position greater than 4% of the time are selected. For each of these couples, a descriptive paragraph concerning the psychological characteristics associated with the color couples displayed, along with the percentage occurrence of that couple in that position.

Pattern Comparison Using MMPI Knowledge Base

In yet another embodiment, the knowledge base may be formed using the Minnesota Multiphasic Personality Inventory (MMPI). For an explanation of the MMPI and how it is administered, please refer to J. N. Butcher, W. G. Dahlstrom, J. R. Graham, A. Tellegen, B. Kraemmer, *Minnesota Multiphasic Personality Inventory (MMP1-2) Manual for Administration and Scoring*, University of Minnesota Press, Minneapolis, 1989, R. L. Greene, *The MMPI-2/MMPI-1: An Interpretive Manual*, Allyn and Bacon 1991; and J. R. Graham, *The MMPI-2 Assessing Personality and Psychopathology*, Oxford University Press, 1990; all of which are incorporated by reference herein.

The Minnesota Multiphasic Personality Inventory-Second Edition (MMPI-2) is a 567-item paper-and-pencil self-report inventory that utilizes the true-false response format. The MMPI is currently the most widely used and researched objective personality inventory. The MMPI provides an objective means of assessing abnormal behavior. The MMPI categorizes the psychological makeup of an individual into ten scales or criterion groups, as follows:

1. Hypochondriasis
2. Depression
3. Hysteria
4. Psychopathic Deviate
5. Masculinity-Femininity
6. Paranoia
7. Psychasthenia
8. Schizophrenia
9. Hypomania
10. Social Introversion In addition, four validity scales measure the individual's test-taking attitude.

The MMPI-2 clinical scales are scaled to the familiar T-score metric having a mean of 50 and standard deviation of 10. These T-scores are based on the responses of approximately 2,600 subjects (1,138 males and 1,462 females). A T-score indicates how many standard deviation units above or below the mean an individual's score lies in a distribution of scores. A T-score of 50 for any particular scale indicates that a subject's score is equal to the mean score for the standardization sample. Generally, T-scores that are greater than or equal to two standard deviations above the mean, i.e., a score above 70, or less than or equal to one standard deviation below the mean, i.e., below 40, are deemed worthy of clinical interpretation. The MMPI scales represent a continuum corresponding to the degree to which a particular criterion, e.g., depression, is expressed in an individual subject. Accordingly, unlike the Myers-Briggs or Lüscher categories, the MMPI criterion groups cannot be simply assigned to psychologically homogenous groups in the knowledge base. Rather, the groups in the knowledge base are formed only from those reference subjects who manifest a high degree of expression of the psychological construct associated with each MMPI scale. The scale scores range from 20 to 115, where 115 corresponds to a high degree of expression. A reference subject is selected for placement in a psychologically homogeneous group if the subject scores above 70 points on the scale for a particular criterion group while scoring below 60 points on all other scales. For example, a subject is classified as depressed if the subject scores above 70 on the depression scale, while scoring below 60 on all the other scales. Alternatively, reference subjects may be classified according to two-point MMPI code types described in Greene and in Graham.

The MMPI knowledge base is employed in the pattern comparison in much the same way as the Myers-Briggs knowledge base. That is, 30 phrases of eight states each are collected from the test subject. These 30 phrases are converted into 240 cepstral vectors. The eight cepstral vectors corresponding to the first phrase are compared using the Viterbi algorithm with the three-cluster sets representing each state for the first MMPI criterion group. The first phrase is similarly compared to the other nine criterion groups. This process is repeated for the second through thirtieth phrases. The result is 30×10=300 Viterbi similarity values. This data is reduced by assigning only the criterion group that resulted in the highest similarity value for each phrase. This results in 30 criterion groups corresponding to the 30 phrases. As with the Myers-Briggs knowledge base, the frequency of occurrence of each criterion group is divided by 30 to yield the percentage of the total personality space for the test subject. Any criterion group that accounts for less than 3% is ignored by the program. The CPU then displays the remaining criterion groups along with the corresponding percentage of the test subject's personality space.

Those skilled in the art will recognize that the present invention may similarly be applied to other psychological assessment scales, such as the Millon Clinical Multiaxial Inventory-3rd Edition (MCMI-III). The MCMI-III is a 175-item paper-and-pencil self-report inventory that also utilizes a true-false response format. The test comprises 14 personality scales. The 14 scales provide a statistically significant differentiation of subjects on the basis of the DSM-III and DSM-III-R nosology of personality disorders. The 14 scales are named: Schizoid, Avoidant, Depressive, Dependent, Histrionic, Narcissistic, Antisocial, Aggressive (Sadistic), Compulsive, Passive-Aggressive (Negativistic), Self-Defeating, Schizotypal, Borderline, and Paranoid. The scales are scaled to a T-score metric. However, the T-scores are adjusted so that a score of 85 corresponds to actual prevalence rate of the trait measured, a score of 60 corresponds to the median raw score, and a score of 115 corresponds to the maximum attained raw score. In general, scores between 75 to 84 indicate the presence of the measured disorder, whereas scores greater than 84 indicate the prominence of the measured disorder. Based upon these statistics, present invention may employ the MCMI-III in a manner similar to use of MMPI by assigning reference subjects to a psychologically homogeneous group in the knowledge base if they score above 84 on the scale corresponding to the psychologically homogeneous group while scoring less than 75 on the other scales.

Alternative Scaling Method

In yet another embodiment, a group of reference subjects may be tested on a personality inventory, and then trichotomized on the basis of their scores on the inventory using standard test construction techniques. The three groups form psychologically homogeneous groups for the inventory scale. Speech parameters are collected from these groups to form three speech models in the knowledge base.

For example, the subjects may be tested on a depression inventory or scale. The highest scorers (most depressed) may be sorted into group Number 3, the middle or average scorers into group Number 2, and the lowest scorers into group Number 1, forming three corresponding speech models in the knowledge base. Next, the similarity between the speech characteristics of each of a test subject's phrases, phrases 1–30, and the speech models for the extremes of the depression scale groups in the knowledge base, Number 1 and Number 3, are computed. Each phrase is classified as belonging to group Number 1 or group Number 3 within the depression inventory (scale) according to which speech model is closest as measured by the Viterbi algorithm. A total depression score is then obtained as the difference between the number of group Number 3 phrases and the number of group Number 1 phrases within the 30 phrase utterance. This score may be displayed by the system.

A weighted score may be obtained by adding up the group numbers (for group Numbers 1, 2 and 3) for each of the 30 phrases. This technique gives a greater weight, i.e., 3, to the phrases corresponding to the most depressed group in the knowledge base. Following the convention of adjusting psychological scales according to their dispersion about their means, the mean and standard deviation of the depression scale can be computed and used to transform the obtained depression scores (or raw scores) to standardized scores. Additionally the depression scale distribution may be normalized or smoothed to conform to standard psychological practice. This method can be extended to tests with multiple scales by applying the above described procedure scale by scale. In this way, these measures can be used to analyze the vocal utterance to imitate a wide variety of scale-based tests.

Measuring the Degree of Sincerity

The present invention may be employed to measure the degree of sincerity of a test subject, where the extremes of the sincerity continuum represent falsehood and truth. In one embodiment, the knowledge base may be formed of two psychologically homogeneous groups—liars and truth tellers. Using one technique, the reference subjects are psychologically stressed by instructing them to make true and false statements about personally catastrophic events, such as a death in the family. The groups may actually comprise the same people, where the liars' group in the knowledge base contains speech parameters from those people speaking lies and the truthful group in the knowledge base contains speech parameters of those people making true statements.

Alternatively, the reference subjects are instructed that they are participating in an experiment to determine the accuracy of a lie detector. The reference subjects are randomly partitioned into two groups. One group is instructed to tell the truth, and the other group is instructed to lie. The group that is instructed to lie is offered a reward if they are able to deceive the lie detector successfully. The inducement of a reward serves to effect the heightened anxiety that may be experienced by individuals that lie to obtain some secondary gain, e.g., escape from punishment, attainment of a job). The respective speech parameters of the liars and the truthtellers are entered into the knowledge base.

As with other tests, 30 phrases of eight states each are collected from the test subject to perform the pattern comparison. These 30 phrases are converted into 240 cepstral vectors. The eight state cepstral vectors corresponding to the first phrase are compared using the Viterbi algorithm with each three-cluster set representing each state for the truthful group. The first phrase is similarly compared to the liars' group in the knowledge base. This process is repeated for the second through thirtieth phrases. The result is 30×2=60 Viterbi similarity values. This data is reduced by assigning to each phrase only the group that resulted in the highest similarity value for each phrase. This results in 30 groups (true or false) corresponding to the 30 phrases. The frequency of occurrence of each group is divided by 30 to yield a percentage measure of the truthfulness of the test subject's utterance. The percentage scores for each group may be normalized to conform to standard psychological practice. If the percentile rank assigned to truthfulness is greater than the 84th percentile (one standard deviation), then the thirty-phrase utterance is deemed as being truthful. Conversely, if the percentage of falsity is greater than the 84th percentile, then the utterance is deemed to be false. If the 84 percentile threshold is not met for either falsity or truthfulness, then the veracity of the utterance is deemed to be questionable. Alternatively, a 98 percentile rank (two standard deviation) threshold may be employed to achieve a greater degree of certainty. One or two standard deviations are conventional statistical thresholds in the physical and social sciences, of course, other thresholds may be employed if warranted by other psychological testing methods.

Unlike the other tests described above, the measure of sincerity is time-dependent on the truth or falsity of the utterance being made by the test subject. Accordingly, sincerity is displayed as a function of time, as shown in FIG. 6. The figure illustrates a sonogram in which the sonogram trace is colored red for those utterances which are deemed false, and colored blue for those utterances deemed truthful. Utterances of questionable veracity are displayed in a violet color on the sonogram. These colors will vary over time with the truthfulness of the statement made by the subject.

Other time-dependent psychological characteristics may also be displayed in this manner. For example, a psychologically homogeneous group of reference subjects uttering humorous statements may be formed, along with a group making serious statements. A pattern comparison similar to that used for truth and falsity may be employed. In this case, humor may be displayed with a green color on the sonogram. Those skilled in the art will recognize that this color sonogram display technique may be employed to display any psychological, physiological or other characteristics of the speaker. In particular, the color display for any of these characteristics may vary with time according to the characteristic measured at a particular time as the subject speaks.

In another embodiment, the invention indicates time-dependent psychological characteristics using the SOCION theory of inter-typology cooperation developed in the former Soviet Union by A. Augustinavichute, R. Bogdashevsky, and V. Alexeev. The SOCION theory is described in A. Augustinavichute, *Inter-Type Relations Further to the "A" Module Description*, Latvia 1980 and E. Filatov, "SOCIONICA For You," *Siberian Chronograph*, Novosiborsk City 1993 (ISBN 5-87550-010-7), which are incorporated by reference herein. The SOCION matrix is a representation of the degree to which individuals classified by 16 SOCION types will cooperate and work productively with one another. The 16 SOCION types can be considered modified Myers-Briggs types, and are, in fact, the result of modifications by Augustinavichute, et al. to the Myers-Briggs assessment.

The SOCION matrix has rows 1–16, where the ith row represents an individual who is predominantly of the ith SOCION character type. The matrix also has columns 1–16, where the jth column represents individuals who are predominantly of the jth character type. (A person is classified as predominantly of one type if matched to that type more than all other types.) Each row/column intersection ij indicates the relationship between an individual of the ith type and an individual of the jth type based upon the SOCION theory of inter-typology cooperation. The SOCION matrix is illustrated in FIG. 7. Each intersection ij is filled with a symbol indicating the predicted nature of an interpersonal relationship between a person of the ith type and a person of the jth type, and in particular, the likelihood that a person of the ith type would cooperate in a complementary and productive fashion with a person of the jth type.

The present invention adapts the normative (inter-individual) approach of the SOCION matrix for an ipsative (intra-individual) purpose. Applying group data to interpretation of an individual in this manner is rooted in the application of the well-known principles of inferential statistics and "true score" theory.

The present invention employs the SOCION matrix to measure the degree of sincerity as follows. The matrix is stored in a lookup table in memory 106. A knowledge base is formed based upon the 16 SOCION types in much the same way it is formed for the Myers-Briggs assessment. In other words, a statistically large group of reference subjects are assessed under the SOCION theory, and thereby divided into 16 SOCION types. As a test subject speaks, each phrase is divided into 8 states. Thirty phrases are not required. One cepstral vector is calculated for each state. Using the Viterbi algorithm, each eight-state phrase is compared to each of the 16 SOCION speech models. For each phrase, the two speech models that correlate most highly with the phrase (i.e., the two highest ranked models) are retained. The two SOCION types that correspond to these speech models are used as row and column indexes of the SOCION matrix. For each phrase, the intersection of these two indexes is retained.

According to the SOCION theory, if the intersection of the indexed row and the indexed column indicate that the two typologies are in conflict, this indicates stress in the test subject as the test subject speaks the phrase. Referring to FIG. 7, if the intersection of the two typologies in the matrix is represented by a "D," then the two typologies are in conflict and indicate that it is likely that the test subject is lying while speaking the phrase under test. In the sonogram, the portion corresponding to this phrase is colored red to indicate a lie.

If the intersection of the two typologies contains the symbol "hs," then this casts some doubt on the truthfulness of the phrase. In the sonogram, the phrase would then be colored violet.

If the intersection of the typologies contains the symbol "R," then this indicates that the test subject is speaking the phrase in a humorous manner. This state of mind is represented by green on the sonogram portion that indicates that the phrase is being spoken. All other symbols indicate no conflict within the individual test subject, and are indicated by a blue color on the sonogram.

The matrix relating the degree of sincerity to SOCION types, Jungian types or other psychological measures may be formed as follows. First, groups of liars and truthtellers are formed as described above. For the example of the Myers-Briggs assessment, the matrix may be formed by identifying through actuarial analysis the first and second ranked Myers-Briggs types that are displayed most consistently and frequently in the voice of liars than in the voice of truthtellers. The presence of these two types in the voice of a test subject serves as a marker for false statements.

Measuring Degree of Cooperation

The present invention may also be employed in conjunction with the SOCION matrix to determine the degree of cooperation between individuals. First, one individual speaks into the system of the invention. In a manner similar to that described above with respect to the Myers-Briggs assessment, the system generates a SOCION assessment of the individual. Second, another individual speaks into the invention, providing another SOCION assessment. The highest ranking SOCION types from the two individuals are used as row and column indexes of the SOCION matrix. The degree of cooperation between the individuals is determined by the system at the intersection between the first and second indexes. This process is performed by the speech processing software in the same manner as if the individuals had taken pencil-and-paper SOCION assessments and their resulting character types used to index the matrix.

Physiological Testing

The present invention may also be employed for physiological testing. In this case, the psychologically homogeneous groups in the knowledge base described above are replaced by physiologically homogeneous groups. For example, a group of patients with heart problems form one physiologically homogeneous group, whereas a group of healthy subjects form another physiologically homogeneous group. Thirty phrases of a test subject's speech are recorded and analyzed to determine the probability that the test subject falls within either category. The frequency of occurrence of each group is divided by thirty to yield a percentage measured for each group. The percentage scores for each group may be normalized to conform to standard practice. If the percentile rank associated with either group is greater than the 84 percentile (one standard deviation), or alternatively the 98 percentile (two standard deviations), the subject is deemed to belong to that group. Otherwise, the test is deemed inconclusive. Again, one or two standard deviations are conventional statistical thresholds in test construction of course, other thresholds may apply based upon the condition studied.

Determining Efficacy of Medication

Based on the foregoing, the present invention can detect the presence of psychological or physiological disorders. Conversely, the invention, of course, can detect the absence of such disorders. Accordingly, a test subject having a disorder as indicated by the present invention may be prescribed a given medication to treat the disorder. After treatment, the present invention may be employed to assess the test subject for the treated psychological or physiological disorder. If the invention determines that the disorder has been mitigated, then this mitigation may have been due to the drug or other treatment [don't limit to medication]. For example, a test subject indicated as suffering from severe depression through comparison to the MMPI knowledge base may be treated with an antidepressant medication or psychotherapy. After a round of treatment, mitigation of the depression may be measured by the invention. Large groups of test subjects may be assessed in this manner to determine the efficacy of a medication or other treatment. Therefore, the present invention may be employed both to conduct statistical trials of a treatment, and to determine the effectiveness of a treatment on an individual test subject.

The present invention has additional applications in any field where psychological or physiological testing is currently used. Moreover, because the present invention can perform these assessments in a relatively short period of time, based on a short speech sample, it can reduce the expense and effort to conduct such tests. Further, the invention allows these assessments to be employed in applications for which conventional testing would be subject to unacceptable time and money constraints. Such applications include, without limitation, rapid airline passenger security screening, rapid psychological screening in a managed health care environment, and monitoring of compliance and motivation of substance abusers under treatment.

An important aspect of the present invention is that it can be easily trained to associate speech parameters with psychological or physiological characteristics regardless of the (non-speech based) assessment employed to quantify those characteristics. The system operator need only administer the assessment, e.g., Myers Briggs, to a statistically significant group of reference subjects, and record speech samples from each homogeneous group determined by the assessment. Determination of the number of subjects necessary to achieve statistical significance is known in the art, and is described in L. M. Crocker and V. Alqina, *Introduction to Classical and Modern Test Theory*, New York: Holt, Rinehart and Winston, 1986, which is incorporated by reference herein. Based upon this empirical data, the speech-based system of the invention then creates a knowledge base representing the desired assessment in the "speech domain." In this manner, the system is easily trainable to administer any test using a rapid characterization of a test subject's speech.

Further, the invention does not relate to a particular psychological or physiological theory about what specific speech characteristics distinguish one homogeneous group from another. Moreover, it does not require any a priori knowledge of speech, although it may be adapted to take such information into account. Rather, as described above, it is based upon an empirical analysis of speech using a broad speech model. In one embodiment, speech is characterized with an LPC model based upon a time-ordered series of frequency characteristics, e.g., eight cepstral vectors per phrase. This time/frequency representation provides a description of speech that is much broader than (and independent of a priori knowledge of) the specific dimensions of speech or speech style elements employed by the prior art. This LPC model also accounts for the relative phase of different frequencies, unlike most, if not all, of the known prior art. This broad model is then empirically correlated with a psychological or physiological assessment. This relatively full, yet still compact, characterization permits the system a great deal of flexibility in the types of assessments that may be carried out.

The invention is also not location dependent. That is, the test subject does not need to be proctored by a test administrator located within the same room. Rather, the speech acquisition circuitry may be located remotely from the signal processing circuitry that performs the comparison with the knowledge base. For example, the test subject's speech may be digitized by the subject's home computer and transmitted by modem (e.g., over the Internet) to a central location that provides remote physiological or psychological assessment services. The results are displayed on the home computer. This adaptation is easily implemented using existing technology.

Those skilled in the art will recognize that the present invention may be employed to associate speech parameters with not only psychological and physiological conditions, but any other condition present in an individual. This can be achieved as long as the correlation between a subject's condition and the subject's speech parameters can be verified as significant through testing independent of the present invention.

Note that all patents and other references cited herein are incorporated by reference herein in their entirety.

Although the invention has been described in conjunction with particular embodiments, it will be appreciated that various modifications and alterations may be made by those skilled in the art without departing from the spirit and scope of the invention. For example, as mentioned above, a wide variety of well-known speech comparison techniques may be adapted for implementation in the present invention. The invention is not to be limited by the foregoing illustrative details, but rather is to be defined by the appended claims.

What is claimed is:

1. A psychological assessment system comprising:

a knowledge base including at least one speech model corresponding to at least one psychological characteristic of a plurality of reference subjects, wherein the speech model is independent of a priori knowledge of style parameters; and signal processing circuitry for comparing the at least one speech model with test speech parameters of a test subject.

2. The system of claim 1, wherein the at least one speech model is represented by a statistical time-ordered series of frequency representations of the speech of the reference subjects.

3. The system of claim 1, further comprising:
speech parameterization circuitry for generating the test parameters in response to the test subject's speech.

4. The system of claim 3, wherein the speech parameterization circuitry includes speech acquisition circuitry that is remote from the knowledge base.

5. The system of claim 1 further comprising:
output circuitry for outputting at least one indicator of a psychological characteristic in response to the comparison.

6. The system of claim 5, wherein the psychological characteristic is time-varying, and the output circuitry outputs the indicator of the psychological characteristic in a time-varying manner.

7. The system of claim 5, wherein the output circuitry further outputs a ranking of each output psychological characteristic.

8. The system of claim 1, wherein the at least one psychological characteristic indicates degree of sincerity.

9. The system of claim 8, wherein the degree of sincerity varies with time.

10. The system of claim 1, wherein the signal processing circuitry compares psychological characteristics before and after treatment for a psychological disorder, wherein the compared psychological characteristics are generated by the comparison of the at least one speech model with the test speech parameters.

11. A method for psychological assessment comprising the steps of:
providing a knowledge base including at least one speech model corresponding to at least one psychological characteristic of a plurality of reference subjects, wherein the speech model is independent of a priori knowledge of style parameters; and
comparing the at least one speech model with test speech parameters of a test subject.

12. The method of claim 11, wherein the at least one speech model is represented by a statistical time-ordered series of frequency representations of the speech of the reference subjects.

13. The method of claim 11, further comprising the step of:
generating the test parameters in response to the test subject's speech.

14. The method of claim 13, further comprising the step of acquiring the test subject's speech remotely from the knowledge base.

15. The method of claim 11 further comprising the step of:
outputting at least one indicator of a psychological characteristic in response to the comparison.

16. The method of claim 15, wherein the psychological characteristic is time-varying, further comprising the step of outputting the indicator of the psychological characteristic in a time-varying manner.

17. The method of claim 15, the outputting step further comprising the step of outputting a ranking of each output psychological characteristic.

18. The method of claim 11, wherein the at least one psychological characteristic indicates degree of sincerity.

19. The method of claim 18, wherein the degree of sincerity varies with time.

20. The method of claim 11, further comprising the step of comparing psychological characteristics before and after treatment for a psychological disorder, wherein the compared psychological characteristics are generated by the comparison of the at least one speech model with the test speech parameters.

21. A physiological assessment system comprising:
a knowledge base including at least one speech model corresponding to at least one physiological characteristic of a plurality of reference subjects, wherein the speech model includes information concerning the vocal tracts of the reference subjects; and
signal processing circuitry for comparing the at least one speech model with test speech parameters of a test subject.

22. The system of claim 21, wherein the at least one speech model is represented by a statistical time-ordered series of frequency representations of the speech of the reference subjects.

23. The system of claim 21, wherein the at least one speech model is independent of a priori knowledge of style parameters.

24. The system of claim 21, further comprising:
speech parameterization circuitry for generating the test parameters in response to the test subject's speech.

25. The system of claim 24, wherein the speech parameterization circuitry includes speech acquisition circuitry that is remote from the knowledge base.

26. The system of claim 21 further comprising:
output circuitry for outputting at least one indicator of a physiological characteristic in response to the comparison.

27. The system of claim 26, wherein the physiological characteristic is time-varying, and the output circuitry outputs the indicator of the physiological characteristic in a time-varying manner.

28. The system of claim 26, wherein the output circuitry further outputs a ranking of each output physiological characteristic.

29. The system of claim 21, wherein the signal processing circuitry compares physiological characteristics before and after treatment for a physiological disorder, wherein the compared psychological characteristics are generated by the comparison of the at least one speech model with the test speech parameters.

30. A method for physiological assessment comprising the steps of:
providing a knowledge base including at least one speech model corresponding to at least one physiological characteristic of a plurality of reference subjects, wherein the speech model includes information concerning the vocal tracts of the reference subjects; and
comparing the at least one speech model with test speech parameters of a test subject.

31. The method of claim 30, wherein the at least one speech model is represented by a statistical time-ordered series of frequency representations of the speech of the reference subjects.

32. The method of claim 30, wherein the speech model is independent of a priori knowledge of style parameters.

33. The method of claim 30, further comprising the step of:
generating the test parameters in response to the test subject's speech.

34. The method of claim 33, further comprising the step of acquiring the test subject's speech remotely from the knowledge base.

35. The method of claim 30 further comprising the step of:
outputting at least one indicator of a physiological characteristic in response to the comparison.

36. The method of claim 35, wherein the physiological characteristic is time-varying, further comprising the step of outputting the indicator of the physiological characteristic in a time-varying manner.

37. The method of claim 35, the outputting step further comprising the step of outputting a ranking of each output physiological characteristic.

38. The method of claim 30, further comprising the step of comparing physiological characteristics before and after treatment for a physiological disorder, wherein the compared physiological characteristics are generated by the comparison of the at least one speech model with the test speech parameters.

39. In a system for assessing at least one psychological or physiological characteristic of a test subject, a knowledge base comprising:
   at least one speech model corresponding to at least one characteristic, wherein the at least one speech model is independent of a priori knowledge of style parameters, and
   a statistical time-ordered series of frequency representations of the speech of a plurality of reference subjects within the at least one speech model.

40. The knowledge base of claim 39, wherein the at least one speech model includes information concerning the vocal tracts of the reference subjects.

41. In a method for assessing at least one psychological or physiological characteristic of a test subject, a method for creating a knowledge base comprising the steps of:
   forming at least one speech model corresponding to at least one characteristic, wherein the at least one speech model is independent of a priori knowledge of style parameters, and
   generating a statistical time-ordered series of frequency representations of the speech of a plurality of reference subjects within the at least one speech model.

42. The method of claim 41, wherein the at least one speech model includes information concerning the vocal tracts of the reference subjects.

43. A physiological assessment system comprising:
   a knowledge base including at least one speech model corresponding to at least one physiological characteristic of a plurality of reference subjects, wherein the at least one speech model is independent of a priori knowledge of style parameters; and
   signal processing circuitry for comparing the at least one speech model with test speech parameters of a test subject.

44. The system of claim 43, wherein the at least one speech model is represented by a statistical time-ordered series of frequency representations of the speech of the reference subjects.

45. The system of claim 43, further comprising:
   speech parameterization circuitry for generating the test parameters in response to the test subject's speech.

46. The system of claim 45, wherein the speech parameterization circuitry includes speech acquisition circuitry that is remote from the knowledge base.

47. The system of claim 43, further comprising:
   output circuitry for outputting at least one indicator of a physiological characteristic in response to the comparison.

48. The system of claim 47, wherein the physiological characteristic is time-varying, and the output circuitry outputs the indicator of the physiological characteristic in a time-varying manner.

49. The system of claim 47, wherein the output circuitry further outputs a ranking of each output physiological characteristic.

50. The system of claim 43, wherein the signal processing circuitry compares physiological characteristics before and after treatment for a physiological disorder, wherein the compared psychological characteristics are generated by the comparison of the at least one speech model with the test speech parameters.

51. A method for physiological assessment comprising the steps of:
   providing a knowledge base including at least one speech model corresponding to at least one physiological characteristic of a plurality of reference subjects, wherein the at least one speech model is independent of a priori knowledge of style parameters; and
   comparing the at least one speech model with test speech parameters of a test subject.

52. The method of claim 51, wherein the at least one speech model is represented by a statistical time-ordered series of frequency representations of the speech of the reference subjects.

53. The method of claim 51, further comprising the step of:
   generating the test parameters in response to the test subject's speech.

54. The method of claim 53, further comprising the step of acquiring the test subject's speech remotely from the knowledge base.

55. The method of claim 51, further comprising the step of:
   outputting at least one indicator of a physiological characteristic in response to the comparison.

56. The method of claim 55, wherein the physiological characteristic is time-varying, further comprising the step of outputting the indicator of the physiological characteristic in a time-varying manner.

57. The method of claim 55, the outputting step further comprising the step of outputting a ranking of each output physiological characteristic.

58. The method of claim 51, further comprising the step of comparing physiological characteristics before and after treatment for a physiological disorder, wherein the compared physiological characteristics are generated by the comparison of the at least one speech model with the test speech parameters.

59. In a system for assessing at least one physiological characteristic of a test subject, a knowledge base comprising:
   at least one speech model corresponding to each characteristic, wherein the speech model includes information concerning the vocal tracts of the reference subjects; and
   a statistical time-ordered series of frequency representations of the speech of a plurality of reference subjects within the at least one speech model.

60. A system for assessing at least one psychological or physiological characteristic of a test subject, the system comprising:
   speech parameterization circuitry for generating test speech parameters in response to the test subject's speech; and
   signal processing circuitry for comparing the test speech parameters with at least one speech model from a knowledge base,
   wherein the at least one speech model corresponds to at least one psychological or physiological characteristic of a plurality of reference subjects, and the at least one speech model is independent of a priori knowledge of style parameters.

61. A system for assessing at least one physiological characteristic of a test subject, the system comprising:

speech parameterization circuitry for generating test speech parameters in response to the test subject's speech; and signal processing circuitry for comparing the test speech parameters of with at least one speech model from a knowledge base, wherein the at least one speech model corresponds to at least one physiological characteristic of a plurality of reference subjects, and includes information concerning the vocal tracts of the reference subjects.

62. A method for assessing at least one psychological or physiological characteristic of a test subject, the method comprising the steps of:

generating test speech parameters in response to the test subject's speech; and comparing the test speech parameters with at least one speech model from a knowledge base, wherein the at least one speech model corresponds to at least one psychological or physiological characteristic of a plurality of reference subjects, and the at least one speech model is independent of a priori knowledge of style parameters.

63. A method for assessing at least one physiological characteristic of a test subject, the method comprising the steps of:

generating test speech parameters in response to the test subject's speech; and comparing the test speech parameters with at least one speech model from a knowledge base, wherein the at least one speech model corresponds to at least one physiological characteristic of a plurality of reference subjects, and includes information concerning the vocal tracts of the reference subjects.

* * * * *